(12) United States Patent
Rudesill et al.

(10) Patent No.: US 7,780,935 B2
(45) Date of Patent: Aug. 24, 2010

(54) METHOD FOR CONTROLLING $NO_x$ EMISSIONS IN THE FCCU

(75) Inventors: John Allen Rudesill, Columbia, MD (US); George Yaluris, Park Ridge, IL (US); Meenakshi Sundaram Krishnamoorthy, Columbia, MD (US); Timothy Dougan, Pasadena, MD (US); Katherine W. Dougan, legal representative, Pasadena, MD (US)

(73) Assignee: W. R. Grace & Co.-Conn., Columbia, MD (US)

( * ) Notice: Subject to any disclaimer, the term of this patent is extended or adjusted under 35 U.S.C. 154(b) by 69 days.

(21) Appl. No.: 11/886,114

(22) PCT Filed: Feb. 23, 2006

(86) PCT No.: PCT/US2006/006543

§ 371 (c)(1),
(2), (4) Date: Sep. 11, 2007

(87) PCT Pub. No.: WO2006/104612

PCT Pub. Date: Oct. 5, 2006

(65) Prior Publication Data

US 2008/0213150 A1    Sep. 4, 2008

Related U.S. Application Data

(60) Provisional application No. 60/664,902, filed on Mar. 24, 2005.

(51) Int. Cl.
*B01D 53/56* (2006.01)
*B01D 53/58* (2006.01)
*C10G 17/00* (2006.01)

(52) U.S. Cl. .................. 423/235; 423/236; 423/237; 423/239.1; 423/239.2; 208/254 R; 208/106; 208/113

(58) Field of Classification Search ............. 208/254 R, 208/106, 113; 423/235, 236, 237, 239.1, 423/239.2
See application file for complete search history.

(56) References Cited

U.S. PATENT DOCUMENTS

| 4,199,435 A | 4/1980 | Chessmore et al. ......... 208/113 |
| 4,290,878 A | 9/1981 | Blanton, Jr. ................. 208/120 |
| 4,428,827 A | 1/1984 | Hobbs et al. ................ 208/120 |
| 4,469,589 A | 9/1984 | Yoo et al. ................... 208/120 |
| 4,471,070 A | 9/1984 | Siefert et al. ............... 502/302 |
| 4,472,267 A | 9/1984 | Yoo et al. ................... 208/120 |
| 4,472,532 A | 9/1984 | Mooi ........................ 502/302 |
| 4,476,245 A | 10/1984 | Siefert ....................... 502/302 |
| 4,492,677 A | 1/1985 | Yoo et al. ................... 423/244 |
| 4,492,678 A | 1/1985 | Yoo et al. ................... 423/244 |
| 4,495,304 A | 1/1985 | Yoo et al. ....................... 502/66 |
| 4,495,305 A | 1/1985 | Yoo et al. ....................... 502/65 |
| 4,522,937 A | 6/1985 | Yoo et al. ................... 502/302 |
| 4,529,502 A | 7/1985 | Wang ......................... 208/164 |
| 4,529,574 A | 7/1985 | Wang ......................... 423/244 |
| 4,613,428 A | 9/1986 | Edison ....................... 208/113 |
| 4,642,178 A | 2/1987 | Yoo et al. ................... 208/113 |
| 4,728,635 A | 3/1988 | Bhattacharayya ........... 502/304 |
| 4,735,705 A | 4/1988 | Burk, Jr. et al. ............ 208/113 |
| 4,758,418 A | 7/1988 | Yoo et al. ................... 423/244 |
| 4,790,982 A | 12/1988 | Yoo et al. ................... 423/239 |
| 4,830,840 A | 5/1989 | Bhattacharyya ............. 423/239 |
| 4,883,783 A | 11/1989 | Burk et al. .................. 502/304 |
| 4,889,615 A | 12/1989 | Chin et al. .................. 208/113 |
| 4,904,627 A | 2/1990 | Bhattacharyya .............. 502/63 |
| 4,946,581 A | 8/1990 | van Broekhoven .......... 208/120 |
| 4,952,382 A | 8/1990 | van Broekhoven .......... 423/244 |
| 4,957,718 A | 9/1990 | Yoo et al. ................... 423/244 |
| 4,957,892 A | 9/1990 | Yoo et al. ..................... 502/63 |
| 4,963,520 A | 10/1990 | Yoo et al. ..................... 502/64 |
| 4,973,399 A | 11/1990 | Green et al. ................ 208/120 |
| 4,980,052 A | 12/1990 | Green et al. ................ 208/120 |
| 4,988,432 A | 1/1991 | Chin .......................... 208/121 |
| 5,002,654 A | 3/1991 | Chin .......................... 208/121 |
| 5,021,146 A | 6/1991 | Chin .......................... 208/122 |
| 5,114,691 A | 5/1992 | Pinnavaia et al. ............ 423/244 |
| 5,114,898 A | 5/1992 | Pinnavaia et al. ............ 502/406 |
| 5,173,278 A * | 12/1992 | Marler et al. ............ 423/239.2 |
| 5,268,089 A | 12/1993 | Avidan et al. ............... 208/113 |
| 5,364,517 A | 11/1994 | Dieckmann et al. ......... 208/121 |
| 5,372,706 A * | 12/1994 | Buchanan et al. ........... 208/113 |
| 5,382,352 A | 1/1995 | Hansen et al. ............... 208/121 |

(Continued)

FOREIGN PATENT DOCUMENTS

WO    95/03876    2/1995

(Continued)

OTHER PUBLICATIONS

American Chemical Society Symposium Series, Contaminant-Metal Deactivation and Metal-Dehydrogenation Effects During Cyclic Propylene Steaming of Fluid Catalytic Cracking Catalysts, No. 634, Chapter 12, pp. 171-183 (1996) by L.T. Boock, T.F. Petti, and J.A. Rudesill.

(Continued)

*Primary Examiner*—Timothy C Vanoy
(74) *Attorney, Agent, or Firm*—Charles A. Cross; Beverly J. Artale

(57) ABSTRACT

A process for the reduction of $NO_x$ emissions from a regeneration zone during a fluid catalytic cracking (FCC) process are disclosed. The process comprises contacting a hydrocarbon feedstock with a circulating inventory of an FCC cracking catalyst and a $NO_x$ reduction composition during an FCC process. The $NO_x$ reduction composition comprises at least one reduced nitrogen species component having the ability to reduce the content of reduced nitrogen species to molecular nitrogen under reducing or partial burn FCC conditions and at least one $NO_x$ reduction component having the ability to convert $NO_x$ to molecular nitrogen under oxidizing or full burn FCC conditions.

42 Claims, 8 Drawing Sheets

U.S. PATENT DOCUMENTS

| | | | |
|---|---|---|---|
| 5,565,181 | A | 10/1996 | Dieckmann et al. ....... 423/239.1 |
| 5,705,053 | A * | 1/1998 | Buchanan .................... 208/113 |
| 5,830,346 | A * | 11/1998 | Harandi et al. ............... 208/113 |
| 6,117,813 | A | 9/2000 | McCauley et al. ........... 502/303 |
| 6,129,834 | A | 10/2000 | Peters et al. ........... 208/120.01 |
| 6,143,167 | A | 11/2000 | Peters et al. ................ 208/113 |
| 6,165,933 | A | 12/2000 | Peters et al. ................ 502/330 |
| 6,280,607 | B1 | 8/2001 | Peters et al. ........... 208/120.01 |
| 6,358,881 | B1 | 3/2002 | Peters et al. ................ 502/304 |
| 6,379,536 | B1 | 4/2002 | Peters et al. ........... 208/120.01 |
| 6,479,421 | B1 | 11/2002 | Vierheilig .................... 502/84 |
| 6,660,683 | B1 | 12/2003 | Yaluris et al. ............... 502/241 |
| 2003/0098259 | A1 | 5/2003 | Kelkar et al. ........... 208/120.01 |
| 2004/0072675 | A1 | 4/2004 | Kelkar et al. ................ 502/63 |
| 2004/0074809 | A1 | 4/2004 | Yaluris et al. ............... 208/113 |
| 2004/0077492 | A1 | 4/2004 | Yaluris et al. ............... 502/302 |
| 2005/0100494 | A1 | 5/2005 | Yaluris et al. ............... 423/235 |
| 2005/0232839 | A1 | 10/2005 | Yaluris et al. ............... 423/239 |
| 2007/0140942 | A1 * | 6/2007 | Rosen et al. ................ 423/235 |

FOREIGN PATENT DOCUMENTS

| | | |
|---|---|---|
| WO | 03046112 | 6/2003 |
| WO | 2004/033091 | 4/2004 |

OTHER PUBLICATIONS

Sadeghbeigi, Fluid Catalytic Cracking Handbook, Gulf Publ. Co. Houston, 1995, ISBN 0-88415-290-1.

J.S. Magee and M.M. Mitchell, Jr. Eds. Studies in Surface Science and Catalysis vol. 76, Ch 8, pp. 257-292, Elsevier Science Pulbishers B.V., Amsterdam 1993, ISBN 0-444-89037-8 ; G.W. Young, "Realistic Assessment of FCC Catalyst Performance in the Laboratory," in Fluid Catalytic Cracking: Science and Technology.

Scherzer, "Octane Enhancing Zeolitic FCC Catalysts", Marcel Dekker, New York, 1990, ISBN 0-8247-8399-9, pp. 165-182.

G. Yaluris and A.W. Peters "Studying the Chemistry of the FCCU Regenerator in the Laboratory Under Realistic Conditions," Designing Transportation Fuels for a Cleaner Environment, J.G. Reynolds and M.R. Khan, eds., p. 151, Taylor & Francis, 1999, ISBN: 1-56032-813-4.

G. W. Young, G. D. Weatherbee, and S. W. Davey, "Simulating Commercial FCCU yields with the Davison Circulating Riser (DCR) pilot plant unit," National Petroleum Refiners Association (NPRA) Paper AM88-52, Mar. 20-22, 1988.

* cited by examiner

Effectiveness of Additive B for reducing NO emissions by reacting NO with CO in the RTU Effectiveness of Additive F for reducing NO emissions by reacting NO with CO in the RTU Effectiveness of Additive G for reducing $NH_3$ emissions in the presence of CO and $O_2$ in the RTU Effectiveness of Additive G for minimizing NO formation during $NH_3$ conversion in the RTU Effectiveness of Additive I for minimizing NO formation during $NH_3$ conversion in the RTU.

Effectiveness of Additive K for reducing $NH_3$ emissions in the presence of CO and $O_2$ in the RTU.

Effectiveness of Additive K for minimizing NO formation during $NH_3$ conversion in the RTU.

METHOD FOR CONTROLLING $NO_x$ EMISSIONS IN THE FCCU

This application is a 35 USC 371 filing of PCT International Application No. PCT/US2006/006543, filed on Feb. 23, 2006, which claims the priority of U.S. Provisional Application No. 60/664,902, filed on Mar. 24, 2005.

This application also claims the benefit of Provisional Application No. 60/664,902, filed on Mar. 24, 2005, under Title 35, United States Code, §119(e).

FIELD OF THE INVENTION

The present invention relates to $NO_x$ reduction compositions and the method of use thereof to reduce $NO_x$ emissions in refinery processes, and specifically in fluid catalytic cracking (FCC) processes. In particular, the present invention relates to $NO_x$ reduction compositions and processes for reducing $NO_x$ emissions released from a FCC unit (FCCU) regeneration zone operating under a heterogeneous combustion mode during a FCC process.

BACKGROUND OF THE INVENTION

An increased concern about air pollution from industrial emissions of noxious oxides of nitrogen, sulfur and carbon have led governmental authorities to place limits on allowable emissions of one or more of such pollutants. Clearly, the trend is in the direction of increasingly stringent restrictions.

$NO_x$, or oxides of nitrogen, in flue gas streams exiting from FCC regenerators is a pervasive problem. FCCUs process hydrocarbon feeds containing nitrogen compounds, a portion of which is contained in the coke on the catalyst as it enters the regenerator. Some of this coke nitrogen is eventually converted into $NO_x$ emissions, either in the FCC regenerator or in a downstream CO boiler. Thus all FCCUs processing nitrogen-containing feeds can have a $NO_x$ emissions problem due to catalyst regeneration.

In a FCC process, catalyst particles or inventory are repeatedly circulated between a catalytic cracking zone and a catalyst regeneration zone. During regeneration, coke from the cracking reaction deposits on the catalyst particles and is removed at elevated temperatures by oxidation with oxygen containing gases such as air. The removal of coke deposits restores the activity of the catalyst particles to the point where they can be reused in the cracking reaction. The coke removal step is performed over a wide range of oxygen conditions. At the minimum, there is typically at least enough oxygen to convert essentially all of the coke made to CO and $H_2O$. At the maximum, the amount of oxygen available is equal to or greater than the amount necessary to oxidize essentially all of the coke to $CO_2$ and $H_2O$.

In a FCCU operating with sufficient air to convert essentially all of the coke on the catalyst to $CO_2$ and $H_2O$, the gas effluent exiting the regenerator will contain "excess oxygen" (typically 0.5 to 4% of total off gas). This combustion mode of operation is usually called "complete burn" or "full burn". When the FCCU regenerator is operating in full burn mode, the conditions in the regenerator are for the most part oxidizing. That is, there is at least enough oxygen to convert (burn) all reduced gas phase species (e.g., CO, ammonia, HCN) regardless of whether this actually happens during the residence time of these species in the regenerator. Under these conditions, essentially all of the nitrogen deposited with coke on the catalyst during the cracking process in the FCCU riser is eventually converted to molecular nitrogen or $NO_x$ and exits the regenerator as such with the off gas. The amount of coke nitrogen converted to $NO_x$ as opposed to molecular nitrogen depends on the design, conditions and operation of the FCCU, and especially of the regenerator, but typically the majority of coke nitrogen exits the regenerator as molecular nitrogen.

On the other hand, when the amount of air added to the FCCU regenerator is insufficient to fully oxidize the coke on the cracking catalyst to $CO_2$ and $H_2O$, some of the coke remains on the catalyst, while a significant portion of the coke carbon burned is oxidized only to CO. In FCCUs operating in this fashion, oxygen may or may not be present in the regenerator off gas. However, should any oxygen be present in the regenerator off gas, it is typically not enough to convert all of the CO in the gas stream to $CO_2$ according to the chemical stoichiometry of

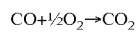

$$CO + \tfrac{1}{2}O_2 \rightarrow CO_2$$

This mode of operation is usually called "partial burn." When a FCCU regenerator is operating in partial burn mode, the CO produced, a known pollutant, cannot be discharged untreated to the atmosphere. To remove the CO from the regenerator off gas and realize the benefits of recovering the heat associated with burning it, refiners typically burn the CO in the regenerator off gas with the assistance of added fuel and air in a burner usually referred to as "the CO boiler". The heat recovered by burning the CO is used to generate steam.

When the regenerator is operating in partial burn, the conditions in the regenerator, where the oxygen added with air has been depleted and CO concentration has built up, are reducing. That is, there is not enough oxygen to convert/burn all reduced species regardless if some oxygen is actually still present. Under these conditions some of the nitrogen in the coke is converted to so called "reduced nitrogen species", examples of which are ammonia and HCN. Small amounts of $NO_x$ may also be present in the partial burn regenerator off gas. When these reduced nitrogen species are burnt in the CO boiler with the rest of the regenerator off gas, they can be oxidized to $NO_x$, which is then emitted to the atmosphere. This $NO_x$ along with any "thermal" $NO_x$ formed in the CO boiler burner by oxidizing atmospheric $N_2$ constitute the total $NO_x$ emissions of the FCCU operating in a partial or incomplete combustion mode.

FCCU regenerators may also be designed and operated in an "incomplete burn" mode intermediate between full burn and partial burn modes. An example of such an intermediate regime occurs when enough CO is generated in the FCCU regenerator to require the use of a CO boiler, but because the amounts of air added are large enough to bring the unit close to full burn operation mode, significant amounts of oxygen can be found in the off gas and large sections of the regenerator are actually operating under oxidizing conditions. In such case, while gas phase reduced nitrogen species can still be found in the off gas, significant amounts of $NO_x$ may also be present. In most cases a majority of this $NO_x$ is not converted in the CO boiler and ends up being emitted to the atmosphere.

Yet another combustion mode of operating a FCCU is nominally in full burn with relatively low amounts of excess oxygen and/or inefficient mixing of air with coked catalyst. In this case, large sections of the regenerator may be under reducing conditions even if the regenerator is nominally oxidizing. Under these conditions, reduced nitrogen species may be found in the regenerator off gas along with $NO_x$.

Where both oxidizing and reducing regions exist simultaneously within the FCCU regeneration zone, heterogeneous modes of combustion may develop. For example, as the operation conditions within a FCCU regenerator approaches the transition point between full and partial burn (or incomplete burn) combustion modes, oxidizing and reducing regions may exist in the regenerator. Heterogeneous combustion modes may also exist in a FCCU regenerator where the coke content of the catalyst particles is not uniform across the radial or axial dimension of the regenerator, or where oxygen, CO, $CO_2$, $NO_x$, $SO_x$ and gas phase reduced nitrogen and sulfur species formed during regeneration are not uniformly distributed across the radial or axial dimension of the regenerator. Due to poor mixing, the pollutants formed in each area (e.g., CO, $SO_x$, reduced nitrogen and sulfur species in the reducing areas, and $SO_x$ and $NO_x$ in the oxidizing areas) may not have sufficient time to react with gases from other areas and produce a flue gas having the expected composition for the nominal mode of operation of the regenerator. As a result, the flue gas will contain both oxidized and reduced species.

Some regenerators are mainly a large vessel containing the fluidized catalyst being regenerated, while others employ advanced designs to improve catalyst regeneration and the mixing efficiency of coked catalyst and air, or to allow the burning of more coke without overheating the regenerator. Additional complexity is introduced by the different air grid designs employed for air distribution, and the various catalyst/flue gas separation system designs used. The design of the regenerator, the mode of operation, the wear and tear of the equipment during operation, the type and location of the air distribution device (air ring), the fluidized catalyst bed (dense phase bed level), and other factors result in commercial regenerators which often have heterogeneous modes of combustion. The heterogeneity may be in the mixing of coked catalyst coming from the stripper and its distribution throughout the vessel, especially in the angular dimension. Alternatively, the heterogeneity may be in the mixing of air with the catalyst. The result can be a heterogeneous coke distribution on the cracking catalyst inventory being regenerated and/or a heterogeneous composition of the gas phase throughout the regenerator. All these heterogeneities may occur simultaneously. In this respect the depth of the catalyst dense phase bed (dimension L) versus the diameter of the regenerator (dimension D) is important in facilitating the evolution of heterogeneities in the FCCU regenerator. For example, a low L/D value can be conducive to creating both coked catalyst and air maldistribution. In extreme cases, when L/D is too low for the air superficial velocity employed, channeling of gases through the bed may occur. Thus, the condition exists where air moves through the catalyst bed as a continuous stream, forming few or no bubbles, and allowing little or no contact with the surrounding catalyst and gases. A large L/D value can also result in increased catalyst traffic through the cyclones, increase back pressure and impact the distribution of both spent catalyst and air throughout the regenerator vessel.

Further, heterogeneous combustion modes may also exist in a FCCU regeneration zone comprised of multistage or multiple regeneration vessels. In this case, the catalyst regeneration zone consists of two or more regenerator vessels, each one optionally operating in a different combustion mode or, alternatively each regenerator vessel may have catalyst and/or gas maldistribution and independently operate in a heterogeneous mode of combustion. Typically, in these types of regeneration zones, the cracking catalyst inventory is circulated from one vessel to the other and then on to the riser and stripper. The flue gas from the first stage may be fed into a second stage, or alternatively, sent downstream.

Afterburn is a clear evidence of a regeneration zone suffering from combustion heterogeneities. FCCU operators typically attempt to minimize afterburn with the addition of CO combustion promoters to the unit to facilitate the oxidation of CO in the dense bed. The CO combustion promoter compositions are typically added to the FCCU unit either as a separate particle additive or as an integral component of the cracking catalyst. Thus, use of a CO combustion promoter to control afterburn is another evidence of a regeneration zone suffering from combustion heterogeneities.

Combustion heterogeneities caused by catalyst or gas maldistribution may also be evident when both $O_2$ and CO are detected in the regenerator effluent. For units nominally in full burn excess $O_2$ in the flue gas of equal or greater than 0.1%, preferably equal or greater than 0.3%, most preferred equal or greater than 0.5%, and CO of at least 100 ppm, preferably at least 50 ppm, and most preferred at least 25 ppm respectively indicate that the regenerator is suffering from maldistribution. For units operating in partial burn or incomplete combustion mode having at least 0.1% CO in the flue gas preferably at least 0.5%, most preferred at least 1%, any amount of excess $O_2$ in the flue gas, preferably, more than 0.05%, most preferred more than 0.1%, is evidence of maldistribution.

Temperature gradients throughout the regenerator vessel or vessels both in the radial and axial dimensions may also be symptoms of heterogeneities caused by catalyst or gas maldistribution. FCCU operators typically measure temperatures in the regenerator at various points in the dense bed, the dilute phase, the cyclones, the plenum (if present) and overhead, and the flue gas pipe. A temperature difference between any temperature measurement point above the dense bed and the average dense bed temperature of 10° F., preferably 20° F., most preferred 30° F. is evidence of maldistribution or heterogeneity existing in the regenerator. In the alternative, a temperature gradient across the axial dimension at any point above the air grid of 10° F., preferably 20° F., most preferably 30° F. is evidence of maldistribution or heterogeneity in the regenerator.

Attempts to control $NO_x$ released from a regeneration zone having heterogeneous combustion modes have included adjusting operation conditions of the FCCU during a FCC process. For example, U.S. Pat. Nos. 5,268,089 and 5,382,352 disclose reducing $NO_x$ emissions by operating close to the point of transition between full and partial burn mode (i.e., incomplete combustion mode, or full burn with low excess $O_2$). It is believed that this mode of operation allows $NO_x$ formed in oxidizing sections of the regenerator, and reduced nitrogen species, e.g. $NH_3$, formed in reducing sections of the regenerator to react with each other effectively reducing $NO_x$ emissions. However, even in this mode of operation, $NO_x$ emissions persist and any reduced nitrogen species left is converted to $NO_x$ in a downstream CO boiler and is emitted as $NO_x$ along with any unreacted $NO_x$ escaping the regenerator.

Several additive compositions have been proposed for reducing $NO_x$ emissions from a FCCU regenerator during a FCC process wherein the regenerator is operating in a specified mode of combustion. For example, U.S. Pat. Nos. 6,129,834; 6,143,167; 6,280,607; 6,379,536; 6,165,933 and 6,358,881 discloses additive compositions which are useful for controlling $NO_x$ emissions from a FCCU regenerator operating in a full burn combustion mode. On the other hand, U.S. Pat. No. 6,660,683 discloses additive compositions which are useful for the control of $NO_x$ emissions from a FCCU regenerator operating in a partial or incomplete combustion mode. The additive compositions accomplish $NO_x$ reduction by converting reduced nitrogen species to molecular nitrogen before they exit the partial or incomplete combustion mode regenerator and are converted to $NO_x$ in a downstream CO boiler.

Additive compositions have not been reported for use to control $NO_x$ emissions released from a FCCU regeneration zone operating under heterogeneous combustion modes. Clearly, the use of additives under such conditions presents a particularly difficult challenge to the FCCU operator for several reasons. First, since additive compositions are typically circulated throughout the entire FCCU, the additives will be subjected to various combustion conditions. Secondly, each combustion mode requires a different chemistry to reduce $NO_x$ emissions released from a FCCU regeneration zone operating under heterogeneous combustion conditions during a FCC process. Thirdly, an additive suited for reducing emissions under one combustion regime may be ineffective under another combustion regime and may even promote an increase of $NO_x$ emissions under the other combustion regime.

Consequently, there exists a need in the refining industry for improved processes for reducing $NO_x$ emissions released from a FCCU regeneration zone operating under heterogeneous combustion modes during a FCC process, which processes are simple and effective.

SUMMARY OF THE INVENTION

The essence of the present invention resides in the discovery of particulate compositions which are capable of being circulated throughout a fluid catalytic cracking unit (FCCU) along with the cracking catalyst inventory to simultaneously minimize the content of reduced nitrogen species, e.g. $NH_3$ and HCN, and $NO_x$ present in the off gas of the FCCU regeneration zone when the regenerator is operated in a heterogeneous mode of combustion. Advantageously, processes of the invention exhibit high efficiencies for the oxidation of reduced nitrogen species present in the regions of the regenerator operating under reducing conditions while simultaneously converting $NO_x$ to $N_2$ in regions of the regenerator operating under oxidizing conditions.

In accordance with the process of the invention, $NO_x$ reduction compositions, which comprise (a) at least one component having the ability to convert $NO_x$ to molecular nitrogen under oxidizing conditions and (b) at least one component having the ability to convert gas phase reduced nitrogen species under reducing conditions, are circulated along with the FCC cracking catalyst inventory during a FCC process. The $NO_x$ reduction compositions may be used either as an integral part of the FCC catalyst particles or as separate particle additives. In one embodiment of the invention, the $NO_x$ reduction compositions are used as separate particulate additives and are circulated along with the circulating FCC catalyst inventory. In a preferred embodiment of the invention, components of the $NO_x$ reduction compositions are added to the circulating catalyst inventory independently as separate particles.

Accordingly, it is an advantage of this invention to provide FCC processes for the reduction of the content of $NO_x$ in the off gas released from a FCCU regeneration zone operating in a heterogeneous combustion mode during a FCC process.

It is also an advantage of this invention to provide FCC processes for the reduction of $NO_x$ emissions from a FCCU regeneration zone operating in heterogeneous modes of combustion by simultaneously minimizing the amount of reduced nitrogen species and $NO_x$ emitted from the regeneration zone during a FCC process.

Another advantage of the invention is to provide FCC processes which are effective to oxidize reduced nitrogen species and to reduce $NO_x$ present in a FCCU regeneration zone operating in a heterogeneous mode of combustion without increasing the production of either $NO_x$ or reduced nitrogen species under any combustion mode in the FCCU regenerator.

It is also an advantage of the present invention to provide FCC processes for the reduction of $NO_x$ emissions from a FCCU regeneration zone operating in a heterogeneous combustion mode due to multistage or multiple regeneration vessels in the regeneration zone.

Yet another advantage of this invention is to provide improved FCC processes for the reduction of $NO_x$ emitted in the off gas released from a FCCU regenerator operating under heterogeneous combustion conditions.

These and other aspects of the present invention are described in further detail below.

DETAILED DESCRIPTION OF THE INVENTION

Figure 1:
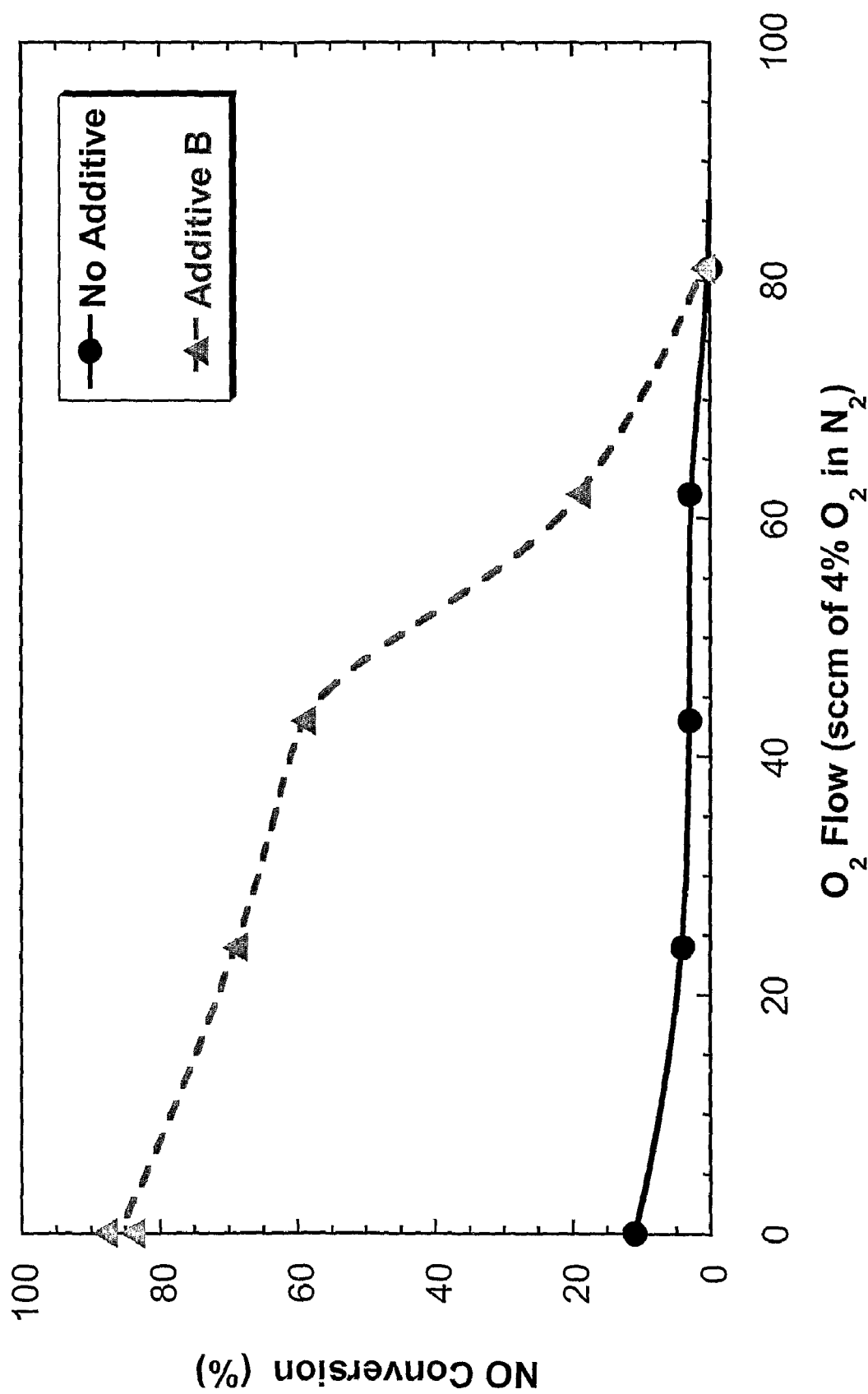
FIG. 1 is a graphic representation of NO conversion in the RTU where NO reacts with CO at various levels of oxygen in a reactor feed in the presence of Additive B.

For purposes of this invention, the term "$NO_x$" is used herein to represent oxides of nitrogen, e.g. nitric oxide (NO) and nitrogen dioxide ($NO_2$), the principal noxious oxides of nitrogen, as well as $N_2O_4$, $N_2O_5$ and mixtures thereof.

The term "reduced nitrogen species" is used herein to indicate any gas phase species formed in the regenerator of a FCCU during a FCC process which gas phase species contain a nitrogen atom having a nominal charge of less than zero. Examples of reduced nitrogen species include, but are not limited to, ammonia ($NH_3$), hydrogen cyanide (HCN), and the like.

The term "reduced sulfur species" is used here to indicate any species formed in the regenerator of a FCCU during a FCC process which species contains a sulfur having a nominal charge of less than zero. Examples of gas phase reduced sulfur species include, but are not limited to, $H_2S$, COS, and the like.

The term "oxidizing conditions" is used here to describe the reaction conditions in an area of a FCCU regenerator where oxygen is present in sufficient amounts to fully oxidize any reduced species present (e.g., CO, NH$_3$, HCN, H$_2$S, COS, gas phase hydrocarbons) according to the applicable stoichiometric reaction, e.g., $$CO+\tfrac{1}{2}O_2 \rightarrow CO_2$$

$$2NH_3+5/2O_2 \rightarrow 2NO+3H_2O$$

$$2HCN+7/2O_2 \rightarrow 2CO_2+2NO+H_2O$$

$$H_2S+3/2O_2 \rightarrow SO_2+H_2O$$

$$COS+3/2O_2 \rightarrow CO_2+SO_2$$

Hydrocarbon+O$_2$—CO$_2$+H$_2$O (stoichiometry is specific to hydrocarbon)

regardless of whether this actually happens during the residence time of these species in the regenerator. While coke on the cracking catalyst is a reductant which can be oxidized by oxygen to CO or CO$_2$, it is not available to react directly over the additive composition like gas phase species are able to do. Thus, coke in-of-itself is not directly included in the reductants considered to define oxidizing conditions.

The term "reducing conditions" is used here to indicate the reaction conditions in an area of a FCCU regenerator where oxygen is not present in sufficient amounts to fully oxidize all reduced species present (e.g., CO, NH$_3$, HCN, H$_2$S, COS, gas phase hydrocarbons) according to the applicable stoichiometric reaction, regardless of whether this actually could happen during the residence time of these species in the regenerator. While coke on the cracking catalyst is a reductant which can be oxidized by oxygen to CO or CO$_2$, it is not available to react directly over the additive composition like gas phase species are able to do. Thus, coke in-of-itself is not directly included in the reductants considered to define reducing conditions.

The term "heterogeneous combustion mode" is used herein to indicate a condition within a FCCU regeneration zone where non-homogeneous regions of oxidizing or reducing conditions exist in the regeneration zone during a FCC process. Typically, such heterogeneous conditions are caused by catalyst or air/gas maldistribution or heterogeneity within the regeneration zone.

The term "catalyst maldistribution or heterogeneity" is used herein to indicate a condition in a FCCU regenerator where the coke content of the catalyst particles in the regenerator, or each regenerator vessel for multi-stage regenerators, is not uniform across the radial or axial dimensions of the regenerator.

The term "gas maldistribution or heterogeneity" is used here to indicate a condition in a FCCU regenerator where in the gas or air in a FCCU regenerator, or each regenerator vessel for multi-stage regenerators, oxygen, CO, NO$_x$, SO$_x$, and gas phase reduced species are not distributed uniformly across the radial or axial dimensions of the regenerator.

The term "afterburn" is used herein to indicate the burning of CO which occurs when CO and O$_2$ escaping the dense bed of fluidized cracking catalyst being regenerated react at any point above the dense catalyst bed, including the area immediately above the dense bed (dilute phase), the cyclones where entrained catalyst is separated from the flue gas, the plenum, overhead above the cyclones, or even the flue gas pipe. Afterburn is measured as the difference between any of the temperatures measured after the regenerator dense bed, or the average of all or any group of such temperatures measured (e.g., dilute phase, cyclone, plenum, overhead, or flue gas temperatures and the like) minus any of the dense bed temperatures or the average of all or any group of dense bed temperatures measured.

For purposes of this invention, the terms "regenerator" and "regeneration zone" are used interchangeably.

In accordance with the present invention, the content of NO$_x$ emitted during a FCC process from a FCCU regeneration zone operating under a heterogeneous mode of combustion is effectively brought to a lower and more acceptable level by simultaneously controlling the amount of reduced nitrogen species and NO$_x$ emissions present in the flue gas released from the regeneration zone. This simultaneous control is accomplished by contacting the circulating cracking catalyst inventory during a FCC process with a NO$_x$ reduction composition comprising (1) at least one reduced nitrogen species component having the ability to reduce the content of reduced nitrogen species by converting the reduced nitrogen species to molecular nitrogen under reducing conditions and (2) at least one NO$_x$ reduction component having the ability to reduce the content of NO$_x$ emissions under oxidizing conditions. It is an important feature of this invention that the reduced nitrogen species component and the NO$_x$ reduction component of the NO$_x$ reduction compositions do not increase the content of reduced nitrogen species or NO$_x$ in the FCCU regeneration zone under any mode of combustion during a FCC process.

For convenience, the present invention will be described with reference to a FCC process although the present cracking process could be used in any conventional cracking process, i.e. thermoform catalytic cracking process, with appropriate adjustments in particle size to suit the requirements of the process. Apart from the addition of the NO$_x$ reduction composition of the invention to the catalyst inventory, the manner of operating the process will remain unchanged. Thus, conventional FCC catalysts may be used, for example, zeolite based catalysts with a faujasite cracking component as described in the seminal review by Venuto and Habib, *Fluid Catalytic Cracking with Zeolite Catalysts*, Marcel Dekker, New York 1979, ISBN 0-8247-6870-1 as well as in numerous other sources such as Sadeghbeigi, *Fluid Catalytic Cracking Handbook*, Gulf Publ. Co. Houston, 1995, ISBN 0-88415-290-1. Typically, the FCC catalysts consists of a binder, usually silica, alumina, or silica-alumina, a Y type acidic zeolite active component, one or more matrix aluminas and/or silica-aluminas, and fillers such as kaolin clay. The Y zeolite may be present in one or more forms and may have been ultra-stabilized and/or treated with stabilizing cations such as any of the rare earths.

Somewhat briefly, the fluid catalytic cracking process in which a heavy hydrocarbon feedstock will be cracked to lighter products takes place by contact of the feed in a cyclic catalyst recirculation cracking process with a circulating fluidizable catalytic cracking catalyst inventory consisting of particles having a mean particle size of from about 50 to about 150 μm, preferably about 60 to about 100 μm. The significant steps in the cyclic process are:

(i) the feed is catalytically cracked in a catalytic cracking zone, normally a riser cracking zone, operating at catalytic cracking conditions by contacting feed with a source of hot, regenerated cracking catalyst to produce an effluent comprising cracked products and spent catalyst containing coke and strippable hydrocarbons;

(ii) the effluent is discharged and separated, normally in one or more cyclone, into a vapor phase rich in cracked product and a solids rich phase comprising the spent catalyst;

(iii) the vapor phase is removed as product and fractionated in the FCC main column and its associated side columns to form gas and liquid cracking products including gasoline;

(iv) the spent catalyst is stripped, usually with steam, to remove occluded hydrocarbons from the catalyst, after which the stripped catalyst is oxidatively regenerated to produce hot, regenerated catalyst which is then recycled to the cracking zone for cracking further quantities of feed.

Suitable feedstocks include petroleum distillates or residuals of crude oils which, when catalytically cracked, provide either a gasoline or a gas oil product. Synthetic feeds having boiling points of about 204° C. to about 816° C., such as oil from coal, tar sands or shale oil, can also be included.

Cracking conditions employed during the conversion of higher molecular weight hydrocarbons to lower molecular weight hydrocarbons include a temperature of 480° C. to about 600° C. A catalyst to hydrocarbon weight ratio of about 1 to 100, preferably about 3 to 20 is contemplated for hydrocarbon conversion. The average amount of coke deposited on the surface of the catalyst is between 0.5 weight percent and 3.0 weight percent depending on of the quality of the feed, the catalyst used, and the unit design and operation. Rapid disengagement of the hydrocarbons from the catalyst is accomplished in a quick-stripping zone either intrinsic within the reactor or located in an external vessel. This stripping function is performed in the presence of steam or another inert gas at a temperature of about 480° C. to about 600° C.

The catalyst regeneration zone of the FCC process includes a lower dense bed of catalyst having a temperature of about 600° C. to about 800° C. and a surmounted dilute phase of catalyst having a temperature of from 600° C. to about 800° C. As it is well known in the art, the catalyst regeneration zone may consist of a single or multiple reactor vessels. In order to remove coke from the catalyst, oxygen is added to the regeneration zone. This is performed by conventional means, such as for example, using a suitable sparging device in the bottom of the regeneration zone or, if desired, additional oxygen is added to other sections of the dense bed or the dilute phase of the regeneration zone.

Preferably, the regeneration zone consists of at least one regenerator vessel having catalyst and/or gas maldistribution regardless of the combustion mode of operation. In one embodiment of the invention, the regeneration zone is operated at the transition stage between full and partial burn conditions. It is also within the scope of the present invention, that the regeneration zone consists of more than one regenerator vessels wherein each regenerator vessel is operated in a different mode of combustion, or have catalyst and/or gas maldistribution regardless of the combustion mode of operation.

In the process of the invention at least two different and distinct catalyst/additive compositions are used in combination to achieve the overall reduction in the content of $NO_x$ emissions emitted from FCCUs having a regeneration zone operating under a heterogeneous combustion mode. At least one of the catalyst/additive compositions must be suitable for reducing $NO_x$ emissions under full burn or oxidizing conditions without having a net result of increasing the formation of reduced nitrogen species under any combustion condition and is hereinafter referred to as the "$NO_x$ reduction component". Additionally, at least one of the catalyst/additive compositions must be able to convert reduced nitrogen species to $N_2$ under partial or incomplete burn or reducing conditions without having a net result of increasing the formation of $NO_x$ under any combustion condition and is hereinafter referred to as the "reduced nitrogen species component". It is an important feature of the present invention that the $NO_x$ reduction component and the reduced nitrogen species component have different and distinct compositions, e.g., do not have the same compositions.

$NO_x$ reduction compositions useful in the process of the invention comprise any physical mixture or blend of at least one fluidizable $NO_x$ reduction component and at least one fluidizable reduced nitrogen species component having the combined effect to reduce $NO_x$ emissions in the flue gas released from a FCCU regeneration zone operating in heterogeneous combustion modes. Typically, the $NO_x$ reduction component useful in the present invention will be any particulate catalyst/additive composition which has the functional property of being effective for reducing $NO_x$ emissions in a FCC unit operating in full burn combustion mode, or alternatively the functional property of being able to convert $NO_x$ to $N_2$ by (a) direct $NO_x$ decomposition, (b) reaction of $NO_x$ with any reductants present in the regenerator such as CO, $NH_3$, HCN, hydrocarbons, coke, and the like, (c) absorption of $NO_x$ in the regenerator and transfer to the riser and stripper for reduction to $N_2$, (d) partial oxidation of any $NO_x$ precursors, such as gas phase reduced nitrogen species, to $N_2$ or (e) any other suitable reaction mechanism, under FCC full burn conditions. In addition, the $NO_x$ reduction component must not significantly increase the formation of reduced nitrogen species when used in a FCCU operating under any combustion condition, but in particular, under partial burn or reducing conditions. That is, when used in a FCCU operating under partial burn or reducing conditions, the $NO_x$ reduction component must not cause an increase in the content of reduced nitrogen species in the FCCU regenerator off gas of more than 10% of the amount of reduced nitrogen species absent the presence of the $NO_x$ reduction component.

One class of materials suitable for use as the $NO_x$ reduction component of the $NO_x$ reduction compositions useful in the present invention includes compositions disclosed and described in U.S. Pat. No. 6,660,683, said patent being herein incorporated in its entirety by reference. Catalyst/additive compositions in this class will typically comprise a particulate mixture of (a) at least 1 wt %, measured as the oxide, of an acidic metal oxide containing substantially no zeolite; (b) at least 0.5 wt % of metal component, measured as the oxide, selected from the group consisting of an alkali metal, an alkaline earth metal and mixtures thereof, alkali metals are preferred, Na and K are most preferred; (c) at least 0.1 wt %, measured as the oxide, of a rare earth or transition metal oxygen storage metal oxide component, Ce is preferred; and (d) at least 0.1 ppm, measured as the metal, of a noble metal component selected from the group consisting of Pt, Pd, Rh, Ir, Os, Ru, Re and mixtures thereof, of which Pt, Pd, Rh, Ir are preferred. All percentages expressed being based on the total weight of the oxidative catalyst/additive composition.

A second class of materials useful as the $NO_x$ reduction component of the $NO_x$ reduction compositions of the present invention includes compositions as disclosed and described in U.S. Pat. Nos. 6,143,167, 6,129,834, 6,280,607 and 6,358,881, the entire disclosures of which are herein incorporated by reference. In general, the $NO_x$ reduction compositions comprise (a) an acidic oxide support; (b) an alkali metal and/or alkaline earth metal or mixtures thereof; (c) a rare earth or transition metal oxide having oxygen storage capability; and (d) a transition metal selected from the Groups Ib and IIb of the Periodic Table. Preferably, the acidic oxide support contains at least 50 wt % alumina and preferably contains silica-alumina. Ceria is the preferred oxygen storage oxide. In a preferred embodiment of the invention, the $NO_x$ reduction composition comprises (a) an acidic oxide support containing at least 50 wt % alumina; (b) 1-10 wt %, measured as the metal oxide, of an alkali metal, an alkaline earth metal or mixtures thereof; (c) at least 1 wt % $CeO_2$, measured as the metal oxide; and (d) 0.01-5.0 parts wt % of a transition metal, measured as metal oxide, selected from Group Ib of the Periodic Table, all weight percentages of components (b)-(d) being based on the total weight of the acidic oxide support material.

Another class of materials useful as the $NO_x$ reduction component of the $NO_x$ reduction compositions of the present invention includes compositions comprising (a) at least 1 wt %, measured as the oxide, of an acidic metal oxide such as disclosed and described in U.S. Pat. Nos. 6,143,167, 6,129,834, 6,280,607 and 6,358,881; (b) at least 0.5 wt %, measured as the oxide, of a metal component selected from the group consisting of an alkali metal, an alkaline earth metal and mixtures thereof; Na, K and Mg being preferred; (c) at least 0.1 wt %, measured as the oxide, of a rare earth or transition metal oxygen storage metal oxide component, of which Ce is preferred; and (d) at least 0.01 wt %, measured as the metal, of a transition metal component selected from the group consisting of Groups, IVA, VA, VIA, VIIA, VIIIA, IB, and IIB of the Periodic Table (previous IUPAC form), Sb, Bi and mixtures thereof. Generally, the transition metal component is selected from the group consisting of Ti, V, Cr, Mn, Fe, Co, Ni, Zr, Nb, Mo, Hf, W, Au, Cu, Zn and mixtures thereof, with Cu, Ag, Zn, Mn, V, Sb, Co, Cr, Fe, Ni and mixtures thereof being preferred. Cu, Zn, Mn, V, Fe and Co are most preferred. All percentages expressed being based on the total weight of the catalyst/additive composition. The compositions of this class can be prepared by any of the methods known in the art as being suitable for making catalysts appropriate for use in fluid or thermofor catalytic cracking. Preferably the compositions of this class are prepared by first preparing a base support consisting of components (a) through (c) using the methods disclosed in published U.S. Patent Application No. US2004/0077492A1, the entire disclosure of which is herein incorporated by reference. The final composition is prepared by adding component (d) to said base support by any of the methods known in the art, such as, for example, by impregnation of the base support with an aqueous solution of at least one component (d) salt, e.g., nitrate, chloride, carbonate and sulfate salts, amine complexes, and the like, in an amount sufficient to provide at least 0.01% of the transition metal, measured as the metal, in the final catalyst/additive composition, and thereafter drying or calcining the impregnated particles at a temperature and at a time sufficient to remove volatiles, e.g., when drying, at about 100° C. to about 250° C. for up to 24 hours or when calcining, at a sufficient temperature, such as about 250° C. to about 900° C., for a sufficient time to form the corresponding oxides.

Another class of materials useful as the $NO_x$ reduction component of the $NO_x$ reduction compositions of the present invention include magnesium-aluminum spinel based compositions heretofore used for the removal of sulfur oxides from an FCC regenerator. Exemplary patents which disclose and describe these types of materials include compositions disclosed and described in U.S. Pat. Nos. 4,428,827; 4,469,589; 4,471,070; 4,472,267; 4,472,532; 4,476,245; 4,492,677; 4,492,678; 4,495,304; 4,495,305; 4,522,937; 4,529,502; 4,529,574; 4,613,428; 4,642,178; 4,728,635; 4,735,705; 4,758,418; 4,790,982; 4,830,840; 4,883,783; 4,904,627; 4,957,718; 4,957,892; and 4,963,520, the entire disclosures of which are herein incorporated by reference. In a preferred embodiment of this invention compositions in this class include at least one metal-containing spinel which includes a first metal and a second metal having a valence higher than the valence of said first metal; and optionally at least one component of a third metal other than said first and second metals and optionally at least one component of a fourth metal other than said first, second and third metals, wherein said third metal is selected from the group consisting of Group IB metals, Group IIB metals, Group VIA metals, the rare earth metals, the Platinum Group metals and mixtures thereof, and said fourth metal is selected from the group consisting of iron, nickel, titanium, chromium, manganese. cobalt, germanium, tin, bismuth, molybdenum, antimony, vanadium and mixtures thereof. Preferably, the first metal is Mg, the second metal is Al, the third metal is at least one of the rare earth metals, of which Ce is most preferred, and the fourth metal is selected from the group consisting of vanadium, iron, nickel, manganese, cobalt, antimony and mixtures thereof.

Yet another class of materials useful as the $NO_x$ reduction component of the $NO_x$ reduction compositions of the present invention include compositions such as those disclosed in U.S. patent application Ser. Nos. 10/909,706 and 10/909,709, the entire disclosure of which are herein incorporated by reference. In general the $NO_x$ reduction compositions of this class comprise zeolites having a pore size ranging from about 3 to about 7.2 Angstroms with a $SiO_2$ to $Al_2O_3$ molar ratio of less than about 500, preferably less than 250. Specific zeolites include ferrierite, ZSM-5, ZSM-11, beta, MCM-49, mordenite, MCM-56, Zeolite-L, zeolite Rho, errionite, chabazite, clinoptilolite, MCM-22, MCM-35, MCM-61, Offretite, A, ZSM-12, ZSM-23, ZSM-18, ZSM-22, ZSM-35, ZSM-57, ZSM-61, ZK-5, NaJ, Nu-87, Cit-1, SSZ-35, SSZ-48, SSZ-44, SSZ-23, Dachiardite, Merlinoite, Lovdarite, Levyne, Laumontite, Epistilbite, Gmelonite, Gismondine, Cancrinite, Brewsterite, Stilbite, Paulingite, Goosecreekite, Natrolite and mixtures thereof. Preferred zeolites are ferrierite, ZSM-5, ZSM-11, beta, MCM-49, mordenite, MCM-56, Zeolite-L, zeolite Rho, errionite, chabazite, clinoptilolite, MCM-22, MCM-35, Offretite, A, ZSM-12 and mixtures thereof. Most preferably, the zeolite is ferrierite. Compositions in accordance with this class of materials may be stabilized with a metal selected from the group consisting of Groups IIA, IIIB, IVB, VB, VIIB, VIIB, VIII, IIB, IIIA, IVA, VA, the Lanthanide Series of the Periodic Table as published by the American Chemical Society, Ag and mixtures thereof. In a preferred embodiment, compositions in accordance with this class of materials are stabilized with a metal selected from the group consisting of Groups IIIB, IIA, IIB, IIIA and the Lanthanide Series of the Periodic Table, and mixtures thereof, with the most preferred metal being lanthanum, aluminum, magnesium, zinc, and mixtures thereof. It is also within the scope of the present invention that compositions in accordance with this class of materials may be stabilized with a stabilizing amount, e.g. up to about 25 wt %, of a metal of Group IB of the Periodic Table, with the stabilizing metal preferably being Cu.

Another class of materials useful as the $NO_x$ reduction component of the $NO_x$ reduction compositions of the present invention include Cu-containing zeolite NOx additive compositions such as those described and disclosed in U.S. Pat. Nos. 4,980,052 and 4,973,399, the entire disclosures of which are herein incorporated by reference. In general the $NO_x$ additive composition comprises zeolites having preferably the crystal structure of ZSM-5, ZSM-11, ZSM-12, ZSM-22, ZSM-23, ZSM-35, ZSM-38, ZSM-48, mordenite, dealuminated Y or Zeolite Beta and a silica to alumina ratio of 20 to 100, and containing Cu metal or ions preferably in an amount equivalent to at least one half mole of CuO for each mole of $Al_2O_3$ in the zeolite.

Still another class of materials useful as the $NO_x$ reduction component of the $NO_x$ reduction compositions of the present invention include catalyst/additive compositions comprising from about 25 to 80 wt % ZSM-5. The ZSM-5 may be in the hydrogen or ammonium form of the zeolite. The ZSM-5 zeolite may be used as a separate particle additive or incorporated in the catalyst as an integral component of the catalyst. When used as a separate particle additive, the ZSM-5 zeolite may be bound with a suitable binder to obtain a particulate material or microsphere appropriate for use in an FCC unit under FCC conditions. Preferably, the binder material is silica, alumina, silica-alumina, alumina-phosphate and mixtures thereof. Where the amount of the zeolite and binder is less than 100 wt % a suitable clay or matrix component, e.g. montmorillonite, kaolin, halloysite, bentonite, attapulgite, and the like, alumina, silica-alumina, rare earth oxides such as lanthana, transition metal oxides such as titania, zirconia, and manganese oxide, group IIA oxides such as magnesium and barium oxides may also be incorporated as a component of the additive composition. When used as an integral catalytic component of the cracking catalyst, the amount of ZSM-5 zeolite will range from about 2 to about 60 wt % of the integral catalyst, and the ZSM-5 zeolite may be incorporated along with conventional catalyst materials in any conventional manner. The integral catalyst will typically contain, in addition to the ZSM-5 zeolite component, USY or REUSY zeolite, a conventional matrix component, e.g., alumina, silica-alumina, rare earth oxides such as lanthana, transition metal oxides such as titania, zirconia, and manganese oxide, Group IIA oxides such as magnesium and barium oxides, clays such as kaolin, and mixtures thereof, and a binder material, e.g., alumina, silica, silica-alumina, aluminum phosphate and the like, and mixtures thereof. The catalyst/additive composition or the integral catalyst can be prepared by any of the methods known in the art as being suitable for preparing fluid or thermofor catalytic cracking catalysts such as the methods disclosed in U.S. patent application Ser. Nos. 10/909,706 and 10/909,709, the entire disclosures of which are herein incorporated by reference. As will be readily understood by one skilled in the art, amounts of components disclosed and described in said applications will be appropriately adjusted to provide final ZSM-5 containing $NO_x$ reduction composition as described hereinabove.

Other materials useful as the $NO_x$ reduction component in the present invention include, but are not limited to, zinc based catalysts such as disclosed and described in U.S. Pat. No. 5,002,654; antimony based $NO_x$ reduction additives such as disclosed and described in U.S. Pat. No. 4,988,432; $NO_x$ reduction additives comprising oxide of elements of Group IIIB of the Periodic Table such as disclosed and described in U.S. Pat. No. 5,021,146; perovskite-spinel $NO_x$ reduction additives such as disclosed and described in U.S. Pat. Nos. 5,364,517 and 5,565,181; oxides of Mg—Al and Cu, and optionally Ce, such as disclosed and described in PCT International Publication No. WO 95/03876; and hydrotalcite based catalyst compositions such as disclosed and described, for example, in U.S. Pat. Nos. 4,889,615, 4,946,581, 4,952,382, 5,114,691, 5,114,898 and 6,479,421 B1, the hydrotalcite based catalyst compositions may further comprise at least one rare earth metal, Ce being preferred, and one or more transition metals selected from the group of iron, nickel, titanium, chromium, manganese, cobalt, germanium, tin, bismuth, molybdenum, antimony, vanadium and mixtures thereof, of which vanadium is preferred. The entire disclosure of each aforementioned patent being herein incorporated by reference.

Another class of materials useful as the $NO_x$ reduction component of the $NO_x$ reduction compositions of the present invention also include low $NO_x$ CO combustion promoter compositions such as described, for example, in U.S. Pat. Nos. 4,290,878 and 4,199,435; the entire disclosure of each aforementioned patent being herein incorporated by reference. In general, the low $NO_x$ CO combustion promoter composition comprises a combustion promoting metal or compound of a metal selected from the group consisting of platinum, palladium, iridium, osmium, ruthenium, rhodium, rhenium, copper and mixtures thereof, associated with at least one particulate porous inorganic solid, preferably including one or more of alumina, titania, silica, zirconia, and the like.

Another class of materials useful as the $NO_x$ reduction component of the $NO_x$ reduction compositions of the present invention include low $NO_x$ CO combustion promoter compositions such as described, for example, in U.S. Pat. No. 6,117,813 the entire disclosure of which being herein incorporated by reference. In general, the low $NO_x$ CO combustion promoter composition includes an effective concentration of at least one Group VIII transition metal oxide, an effective concentration of at least one Group IIIB metal oxide, an effective concentration of at least one Group IIA alkaline earth metal oxide, and, optionally, microspheroidal alumina. The preferred Group VIII metal is Co, the preferred Group IIIB metal is La, and the preferred Group IIA alkaline earth metal is Sr.

Materials useful as the $NO_x$ reduction component of the $NO_x$ reduction compositions of the present invention also include catalyst/additive compositions as disclosed and described in PCT International Publication No. WO 03/046112 and published U.S. Patent Application 2003/0098259, the entire disclosure of each aforementioned publication being herein incorporated by reference. Such $NO_x$ removal compositions generally comprise: (i) an acidic oxide support, (ii) cerium oxide, (iii) a lanthanide oxide other than ceria and optionally (iv) at least one oxide of a transition metal selected from the group consisting of Groups IB and IIB of the Periodic Table, and mixtures thereof.

Another class of materials useful in the present invention as the $NO_x$ reduction component of the $NO_x$ reduction compositions include the compositions for the reduction of CO and $NO_x$ emissions in FCC processes such as those disclosed and described, for example, in PCT International Publication No. WO 2004/033091 and published U.S. Patent application 2004/0072675, the entire disclosures of which are herein incorporated by reference. Such $NO_x$ removal compositions generally comprise: (i) an acidic oxide support, (ii) cerium oxide, (iii) a lanthanide series element other than ceria and (iv) optionally, at least one oxide of a transition metal selected from Groups IB and IIB of the Periodic Table, and mixtures thereof and (v) at least one precious metal from the group consisting of Pt, Pd, Rh, Ir, Os, Ru, Re and mixtures thereof, of which Pt and Pd are preferred.

It is within the scope of this invention that the $NO_x$ reduction component of the $NO_x$ reduction compositions in the present invention will comprise at least one $NO_x$ reduction component or any combination of $NO_x$ reduction components as described hereinabove.

Typically, the reduced nitrogen species component will be any particulate catalyst/additive composition having the functional property of converting reduced nitrogen species to molecular nitrogen when used in an FCCU operating in partial burn or overall reducing FCC conditions, or alternatively, having the functional property of converting reduced nitrogen species to molecular nitrogen under overall reducing conditions by (a) direct decomposition of these species, (b) reaction with any oxidizers typically present in an FCC unit such as $O_2$, NO, $NO_2$ and the like, (c) converting reduced nitrogen species to oxidized nitrogen intermediate species (e.g., NO) which are then reacted with reductants like coke, CO, $NH_3$, etc., present in the regenerator, or (d) converting reduced nitrogen species using any other suitable mechanism, under partial burn FCC conditions. In addition, the reduced nitrogen species component must not significantly increase the formation of $NO_x$ when used in a FCCU operating under any combustion condition, but in particular, under full burn conditions. That is, when used in a FCCU operating under full burn conditions, the reduced nitrogen species component must not cause an increase in the content of $NO_x$ in the FCCU regenerator off gas of more than 10% of the amount of $NO_x$ absent the presence of the reduced nitrogen species component.

One class of materials suitable for use as the reduced nitrogen species component of the $NO_x$ reduction compositions in the present invention comprises compositions disclosed and described in published U.S. patent application No. US 2004/0074809, the entire disclosure of said application being herein incorporated by reference. Catalyst/additive compositions in this class will typically comprise a porous, amorphous or crystalline, refractory support material, e.g. an acidic metal oxide, a spinel, a hydrotalcite, a perovskite or the like, promoted with at least one metal component. Suitable metal promoters include, but are not limited to alkali and/or alkaline earth metals, transition metals (e.g. metals from Groups IVA, VA, VIA, VIIA, VIIIA, IB of the Periodic Table (previously IUPAC form) and mixtures thereof), rare earth metals, Platinum group metals, metals from Group IIB of the Periodic Table, germanium, tin, bismuth, antimony and mixtures thereof. Platinum group metals are particularly preferred. Also preferred are transition metals and rare earth metals having oxygen storage capacity.

Another class of materials suitable for use as the reduced nitrogen species component of the $NO_x$ reduction compositions in the present invention comprises compositions disclosed and described in U.S. Pat. No. 6,660,683, the entire disclosure of said patent being herein incorporated by reference. Catalyst/additive compositions in this class will typically comprise a particulate mixture of (a) at least 1 wt %, measured as the oxide, of an acidic metal oxide containing substantially no zeolite; (b) at least 0.5 wt % of metal component, measured as the oxide, selected from the group consisting of an alkali metal, an alkaline earth metal and mixtures thereof, alkali metals are preferred, Na and K are most preferred; (c) at least 0.1 wt %, measured as the oxide, of a rare earth metal or a transition metal oxygen storage metal oxide component, Ce is preferred; and (d) at least 0.1 ppm, measured as the metal, of a noble metal component selected from the group consisting of Pt, Pd, Rh, Ir, Os, Ru, Re and mixtures thereof, of which Rh, Ir are preferred. All percentages expressed being based on the total weight of the catalyst/additive composition.

Another class of materials suitable for use as the reduced nitrogen species component of the $NO_x$ reduction compositions in the present invention include compositions which comprise (a) at least 1 wt %, measured as the oxide, of an acidic metal oxide containing substantially no zeolite; (b) at least 0.5 wt % of metal component, measured as the oxide, selected from the group consisting of an alkali metal, an alkaline earth metal and mixtures thereof, Na, K and Mg being preferred; (c) at least 0.1 wt %, measured as the oxide, of a rare earth or transition metal oxygen storage metal oxide component, Ce is preferred; (d) at least 0.1 ppm, measured as the metal, of a noble metal component selected from the group consisting of Pt, Pd, Rh, Ir, Os, Ru, Re and mixtures thereof, Pt, Pd, Rh, Ir are preferred, Rh and Ir are most preferred, and (e) at least 0.01 wt %, measured as the metal oxide, of a transition metal selected from the group consisting of Groups, IVA, VA, VIA, VIIA, VIIIA, IB, and IIB of the Periodic Table (previous IUPAC form), Sb, Bi and mixtures thereof. Generally, the transition metal component is selected from the group consisting of Ti, V, Cr, Mn, Fe, Co, Ni, Zr, Nb, Mo, Hf, W, Au, Cu, Zn and mixtures thereof, with Cu, Ag, Zn, Mn, V, Sb, Co, Cr, Fe, Ni and mixtures thereof being preferred. Cu, Zn, Mn, V, Fe and Co are most preferred. All percentages expressed being based on the total weight of the composition. The compositions of this class can be prepared by any of the methods known in the art as being suitable for making catalysts appropriate for use in fluid or thermofor catalytic cracking. Preferably the compositions of this class are prepared by first preparing a base support consisting of components (a) through (c) using the methods as disclosed and described in publication U.S. Patent Application No. US 2004/0077492A1, the entire disclosure of said application being herein incorporated by reference. The final composition is then prepared by adding components (d) and (e) to said base support by any of the methods known in the art such as impregnation of the base support with an aqueous solution of at least one component (d) and one component (e) salt, e.g., nitrate, chloride, carbonate and sulfate salts, amine complexes, and the like, in an amount sufficient to provide at least 0.1 ppm of the noble metal and at least 0.01% of the transition metal, measured as the metal, in the final catalyst/additive composition, and thereafter drying or calcining the impregnated particles to remove volatiles, e.g., drying at about 100° C. to about 250° C. for up to 24 hours or calcining at a temperature of about 250° C. to about 900° C. for a sufficient time to form the corresponding oxides, e.g. for up to about 12 hours.

Another class of materials useful as the reduced nitrogen species component of the $NO_x$ reduction compositions in the present invention include magnesium-aluminum spinel based compositions heretofore used for the removal of sulfur oxides from a FCC regenerator comprising at least one or more platinum group metal. Exemplary patents which disclose and describe magnesium-aluminum spinel based compositions include U.S. Pat. Nos. 4,428,827; 4,469,589; 4,471,070; 4,472,267; 4,472,532; 4,476,245; 4,492,677; 4,492,678; 4,495,304; 4,495,305; 4,522,937; 4,529,502; 4,529,574; 4,613,428; 4,642,178; 4,728,635; 4,735,705; 4,758,418; 4,790,982; 4,830,840; 4,883,783; 4,904,627; 4,957,718; 4,957,892 and 4,963,520; the entire disclosures of which are herein incorporated by reference. The compositions further comprise at least 0.1 ppm, measured as the metal, of one or more of the Platinum Group metal, preferably Rh or Ir. The noble metal is preferably used at 10 to 10000 ppm, more preferably 25 to 5000 ppm and most preferably 30 to 2500 ppm. In a preferred embodiment of this invention, compositions in this class include at least one metal-containing spinel which includes a first metal and a second metal having a valence higher than the valence of said first metal; and at least one component of a third metal other than said first and second metals and optionally at least one component of a fourth metal other than said first, second and third metals, wherein said third metal is one or more of the Platinum Group metals, with additional metals selected from the group consisting of Group IB metals, Group IIB metals, Group VIA metals, the rare earth metals, and mixtures thereof, and said fourth metal is selected from the group consisting of iron, nickel, titanium, chromium, manganese, cobalt, germanium, tin, bismuth, molybdenum, antimony, vanadium and mixtures thereof. Preferably, the first metal is Mg, the second metal is Al, the third metal is at least one of the rare earth metals, of which Ce is most preferred, and at least one of the Platinum Group metals, of which Rh or Ir are preferred, and the fourth metal is selected from the group consisting of vanadium, iron, nickel, manganese, cobalt, antimony and mixtures thereof.

Yet another class of materials useful as the reduced nitrogen species component of the $NO_x$ reduction compositions in the present invention include catalyst/additive compositions such as those disclosed in U.S. patent application Ser. Nos. 10/909,706 and 10/909,709, the entire disclosures of which being herein incorporated by reference, further comprising at least 0.1 ppm of a noble metal component selected from the group consisting of Pt, Pd, Rh, Ir, Ru, Os, and Re and mixtures thereof, preferably Rh or Ir. The noble metal component is preferably used in the amount of from about 10 to about 10,000 ppm, more preferably from about 25 to about 5000 ppm and most preferably from about 30 to about 2500 ppm. In general, the catalyst/additive compositions of this class comprise zeolites having a pore size ranging from about 3 to about 7.2 Angstroms with a $SiO_2$ to $Al_2O_3$ molar ratio of less than about 500, preferably less than 250. Specific zeolites are: ferrierite, ZSM-5, ZSM-11, beta, MCM-49, mordenite, MCM-56, Zeolite-L, zeolite Rho, errionite, chabazite, clinoptilolite, MCM-22, MCM-35, MCM-61, Offretite, A, ZSM-12, ZSM-23, ZSM-18, ZSM-22, ZSM-35, ZSM-57, ZSM-61, ZK-5, NaJ, Nu-87, Cit-1, SSZ-35, SSZ-48, SSZ-44, SSZ-23, Dachiardite, Merlinoite, Lovdarite, Levyne, Laumontite, Epistilbite, Gmelonite, Gismondine, Cancrinite, Brewsterite, Stilbite, Paulingite, Goosecreekite, Natrolite or mixtures thereof. Preferred zeolites are ferrierite, ZSM-5, ZSM-11, beta, MCM-49, mordenite, MCM-56, Zeolite-L, zeolite Rho, errionite, chabazite, clinoptilolite, MCM-22, MCM-35, Offretite, A and ZSM-12. Most preferably, the zeolite is ferrierite. Compositions in accordance with this class of materials may be stabilized with a metal selected from the group consisting of Groups IIA, IIIB, IVB, VB, VIIB, VIIB, VIII, IIB, IIIA, IVA, VA, the Lanthanide Series of the Periodic Table as published by the American Chemical Society, Ag and mixtures thereof. In a preferred embodiment, compositions in accordance with this class of materials are stabilized with a metal from Groups IIIB, IIA, IIB, IIIA and the Lanthanide Series of the Periodic Table, and mixtures thereof, with the most preferred metal being lanthanum, aluminum, magnesium, zinc, and mixtures thereof. It is also within the scope of the present invention that compositions in accordance with this class of materials may be stabilized with a stabilizing amount, e.g. up to about 25 wt %, of a metal of Group IB of the Periodic Table, with the stabilizing metal preferably being Cu. Catalyst/additive compositions of this class can be prepared by the methods disclosed in U.S. patent application Ser. Nos. 10/909,706 and 10/909,709. The noble metal component is added to the catalyst/additive compositions by any method known in the art e.g., ion exchange, impregnation and the like. The metal component may be added to separate particles of the catalyst/additive composition or, in the alternative, to particles of an integral catalyst incorporating both the catalyst/additive composition and the FCC cracking catalyst. Suitable sources of the noble metal and the optional stabilizing component include aqueous solutions of nitrate, chloride, carbonate and sulfate salts, amine complexes, and the like. The salts or complexes are used in an amount sufficient to provide at least 0.1 ppm of the noble metal, measured as the metal, in the final catalyst/additive composition. Thereafter the composition is dried or calcined to remove volatiles, e.g., drying at about 100° C. to about 250° C. for up to 24 hours or calcining at about 250° C. to about 900° C. for up to about 12 hours.

Another class of materials useful as the reduced nitrogen species component of the $NO_x$ reduction compositions in the present invention include Cu-containing zeolite $NO_x$ additive compositions such as those described and disclosed in U.S. Pat. Nos. 4,980,052 and 4,973,399, the entire disclosures of which are herein incorporated by reference. In general, the $NO_x$ additive compositions comprise zeolites preferably having the crystal structure of ZSM-5, ZSM-11, ZSM-12, ZSM-22, ZSM-23, ZSM-35, ZSM-38, ZSM-48, mordenite, dealuminated Y or Zeolite Beta and a silica to alumina ratio of 20 to 100, and Cu metal or ions preferably equivalent to at least one half-mole of CuO for each mole of $Al_2O_3$ in the zeolite, which compositions further comprise at least 0.1 ppm of a noble metal compound, that is Pt, Pd, Rh, Ir, Ru, Os, and Re and mixtures thereof, preferably Rh or Ir. The noble metal is preferably used in an amount ranging from about 10 to about 10,000 ppm, more preferably from about 25 to about 5000 ppm and most preferably from about 30 to about 2500 ppm. The noble metal compound can be added to the compositions disclosed and described in U.S. Pat. Nos. 4,980,052 and 4,973,399 by any methods known in the art e.g., ion exchange, impregnation and the like. The noble metal may be added to the zeolite prior to or after loading Cu onto the zeolite particles. Suitable sources of the noble metal include aqueous solutions of nitrate, chloride, carbonate and sulfate salts, amine complexes, and the like. The salts or complexes are used in an amount sufficient to provide at least 0.1 ppm of the noble metal, measured as the metal, in the final catalyst/additive composition. Thereafter the composition is dried or calcined to remove volatiles, e.g., drying at about 100° C. to about 250° C. for up to 24 hours, or calcining at about 250° C. to about 900° C. for up to 12 hours.

Still another class of materials useful as the reduced nitrogen species component of the $NO_x$ reduction compositions in the present invention include compositions comprising from about 25 to 80 wt % ZSM-5 and at least 0.1 ppm of a noble metal component, e.g., Pt, Pd, Rh, Ir, Ru, Os, and Re and mixtures thereof, preferably Rh or Ir. The noble metal component is preferably used in an amount ranging from about 10 to about 10,000 ppm, more preferably from about 25 to about 5000 ppm and most preferably from about 30 to about 2500 ppm. The ZSM-5 may be in the hydrogen or ammonium form of the zeolite. The ZSM-5 zeolite may be used as a separate particle additive or incorporated as an integral component of the catalyst. When used as a separate particle additive, the ZSM-5 zeolite may be bound with a suitable binder to obtain a particulate material or microsphere appropriate for use in an FCC unit under FCC conditions. Preferably, the binder material is silica, alumina, silica-alumina, alumina-phosphate and mixtures thereof. Optionally, a suitable matrix component, e.g. clay such as montmorillonite, kaolin, halloysite, bentonite, attapulgite, and the like, alumina, silica, silica-alumina, rare earth oxides such as lanthana, transition metal oxides such as titania, zirconia, and manganese oxide, group IIA oxides such as magnesium and barium oxides, may be incorporated as a component of the additive composition. When used as an integral catalytic component of the cracking catalyst, about 2 to about 60 wt % of the ZSM-5 zeolite will be incorporated into the cracking catalyst along with conventional catalyst materials in a conventional manner. The integral catalyst will typically contain, in addition to the ZSM-5 zeolite component, USY or REUSY zeolite, a conventional matrix component, e.g., alumina, silica-alumina, rare earth oxides such as lanthana, transition metal oxides such as titania, zirconia, and manganese oxide, Group IIA oxides such as magnesium and barium oxides, clays such as kaolin, and mixtures thereof, and a binder material, e.g., alumina, silica, silica-alumina, aluminum phosphate and the like, and mixtures thereof. The reduced nitrogen species components in this case can be prepared by using the methods disclosed and described in U.S. patent application Ser. Nos. 10/909,706 and 10/909,709, the entire disclosures of which are herein incorporated by reference, wherein the zeolite used, other than a Y-based zeolite, is ZSM-5 and other components of the composition are used in the amounts required to provided final compositions as described hereinabove. The noble metal component may be added to the ZSM-5 containing zeolite by any method known in the art e.g., ion exchange, impregnation and the like. The noble metal component may be added to particles of the ZSM-5 containing zeolite or an integral catalyst incorporating both the ZSM-5 containing zeolite and the cracking catalyst. Suitable sources of the noble metal include aqueous solutions of nitrate, chloride, carbonate and sulfate salts, amine complexes, and the like. The salts or complexes are used in an amount sufficient to provide at least 0.1 ppm of the noble metal, measured as the metal, in the final catalyst/additive composition. Thereafter the composition is dried or calcined to remove volatiles, e.g., drying at about 100° C. to about 250° C. for up to 24 hours or calcining at about 250° C. to about 900° C. for up to 12 hours.

Other materials suitable as the reduced nitrogen species component of the $NO_x$ reduction compositions in the present invention include, but are not limited to, compositions which comprise zinc based catalysts such as disclosed and described in U.S. Pat. No. 5,002,654; antimony based $NO_x$ reduction additives such as disclosed and described in U.S. Pat. No. 4,988,432; $NO_x$ reduction additives based on oxides of an element of Group IIIB of the Periodic Table such as disclosed and described in U.S. Pat. No. 5,021,146; perovskite-spinel $NO_x$ reduction additives such as disclosed and described in U.S. Pat. Nos. 5,364,517 and 5,565,181; oxides of Mg—Al and Cu, and optionally Ce, as disclosed and described in PCT International Publication No. WO 95/03876; and hydrotalcite based catalyst compositions such as disclosed and described, for example, in U.S. Pat. Nos. 4,889,615, 4,946,581, 4,952,382, 5,114,691, 5,114,898, 6,479,421 B1, the hydrotalcite based catalyst compositions may further comprise at least one rare earth metal, Ce being preferred, and one or more transition metals selected from the group of iron, nickel, titanium, chromium, manganese, cobalt, germanium, tin, bismuth, molybdenum, antimony, vanadium and mixtures thereof, of which vanadium is preferred. The entire disclosure of each aforementioned patent being herein incorporated by reference. Catalyst/additive compositions in accordance with this class of materials further comprise at least 0.1 ppm of a noble metal component, measured as the metal, that is Pt, Pd, Rh, Ir, Ru, Os, Re and mixtures thereof, preferably Rh or Ir. The noble metal component is preferably used in an amount ranging from about 10 to about 10000 ppm, more preferably from about 25 to about 5000 ppm and most preferably from about 30 to about 2500 ppm. The noble metal component is added to the aforementioned compositions by conventional methods, e.g. impregnation, ion exchange and the like. Preferably, the noble metal component is added to the catalyst/additive compositions by impregnation using an aqueous solution of noble metal salts. Suitable salts include nitrate, chloride, carbonate and sulfate salts, amine complexes, and the like. The salts or complexes are used in an amount sufficient to provide at least 0.1 ppm of the noble metal, measured as the metal, in the final catalyst/additive composition. Thereafter, the composition is dried or calcined to remove volatiles, e.g., drying at about 100° C. to about 250° C. for up to 24 hours or calcining at about 250 to about 900° C. for up to about 12 hours.

Another class of materials useful as the reduced nitrogen species component include $NO_x$ removal compositions such as disclosed and described, in PCT International Publication No. WO 2004/033091 and U.S. Patent Application 2004/0072675, the entire disclosures of which are herein incorporated by reference. Such $NO_x$ removal compositions generally comprise: (i) an acidic oxide support, (ii) cerium oxide, (iii) a lanthanide series element other than ceria and (iv) optionally, at least one oxide of a transition metal selected from Groups IB and IIB of the Periodic Table, and mixtures thereof and (v) at least one precious metal selected from the group consisting of Pt, Pd, Rh, Ir, Os, Ru, Re and mixtures thereof, of which Rh and Ir are preferred.

Another class of materials useful as the reduced nitrogen species component include compositions such as those as disclosed and described, for example, in U.S. Pat. No. 6,117,813 the entire disclosure of which is herein incorporated by reference, further comprising at least 0.1 ppm, measured as the metal, of one or more Platinum Group metals (e.g., Pt, Pd, Rh, Ir, Ru, Os, and Re), preferably Rh or Jr. In general the composition includes (i) an effective concentration of at least one Group VIII transition metal oxide, further including at least one or more of the Platinum Group metals, preferably Rh or Ir, (ii) an effective concentration of at least one Group IIIB metal oxide, (iii) an effective concentration of at least one group IIA alkaline earth metal oxide, and, optionally, (iv) microspheroidal alumina. The preferred Group VIII metal is Co, the preferred Platinum Group metal is Rh, the preferred group IIIB metal is La, and the preferred Group IIA alkaline earth metal is Sr.

It is within the scope of this invention that the reduced nitrogen species component of the $NO_x$ reduction compositions of the invention will comprise at least one reduced nitrogen species component or any combination of reduced nitrogen species components as described hereinabove.

In accordance with the present invention, $NO_x$ reduction compositions useful in the invention process may be used as separate particulate additives circulated along with the cracking catalyst inventory, or alternately, incorporated within the cracking catalyst as a component thereof. Where the $NO_x$ reduction compositions are used as separate particulate additives, $NO_x$ reduction components and reduced nitrogen species components comprising the $NO_x$ reduction compositions may be added to the FCC cracking catalyst inventory independently as separate particles, or in the alternative, the components are added to the cracking catalyst invention physically admixed or blended into a single particle additive. In a preferred embodiment of the invention, the components of the $NO_x$ reduction compositions are added to the circulating cracking catalyst inventory independently as separate particles.

$NO_x$ reduction compositions or the components thereof are generally used in the present invention in the form of particles and will have a particle size sufficient to permit the compositions to be circulated throughout the catalytic cracking unit simultaneously with the cracking catalyst. Typically, the $NO_x$ reduction compositions and components thereof will have a mean particle size of greater than 45 µm. Preferably, the mean particle size is from about 50 to 200 µm, most preferably from about 55 to about 150 µm, and even more preferred from about 60 to about 120 µm. Particles comprising the invention composition and components thereof generally have a surface area of at least 5 m²/g, preferably at least 10 m²/g, most preferably at least 30 m²/g, and a Davison Attrition Index (DI) of 50 or less, preferably 20 or less, most preferably 15 or less.

When used as a separate additive, $NO_x$ reduction compositions or the components thereof are used in any amount sufficient to reduce the $NO_x$ emissions present in the FCCU regenerator relative to the amount of $NO_x$ emissions present without the use of the $NO_x$ reduction compostions, as measured by conventional gas analysis methodology, including but not limited to, chemiluminescence, UV spectroscopy, IR spectroscopy, and the like. Typically the amount of the $NO_x$ reduction compositions used as separate particle additives is at least 0.01, preferably at least 0.05, most preferably at least 0.1, wt % of the catalyst inventory. Preferably, the $NO_x$ reduction compositions are used in an amount ranging from about 0.01 to about 45 wt %, most preferably from about 0.05 to about 30 wt % and even more preferably from about 0.1 to about 20 wt % of the cracking catalyst inventory.

When the $NO_x$ reduction compositions are incorporated into or onto the cracking catalyst as a separate component of the cracking catalyst, the $NO_x$ reduction compositions will typically be used in an amount of at least 0.01, preferably at least 0.05, most preferably at least 0.1, wt % of the cracking catalyst composition. Preferably, the $NO_x$ reduction compositions will be used in an amount ranging from about 0.01 to 45 wt %, most preferably from about 0.05 to about 30 wt %, even more preferable from about 0.1 to about 20 wt %, of the cracking catalyst composition.

It is also within the scope of the invention that at least one $NO_x$ reduction component or at least one reduced nitrogen species component comprising the $NO_x$ reduction compositions of the invention may be incorporated into the cracking catalyst as a component thereof as described hereinabove, while the other component, i.e. the $NO_x$ reduction component or reduced nitrogen species component, respectively, is used as a separate particulate additive as described hereinabove.

The relative amount of each of the $NO_x$ reduction component and the reduced nitrogen species component to be used in the $NO_x$ reduction compositions of the invention will vary and is not restricted to any specific ratio. The amount of each component will depend on such factors as the specific unit regenerator design and operation, the mode of operation, the extent of maldistribution for either the catalyst or the gases, the oxygen levels, the presence of any other additives, and the desired $NO_x$ reduction to be achieved. In general, however, the components are used in a ratio of 0.02 to 50, preferably 0.1 to 10, most preferably 0.2 to 5.0. Separate particles of the $NO_x$ reduction compositions and/or components thereof may be added to the catalyst inventory in any conventional manner, e.g., with make-up catalyst to the regenerator or by any conventional method.

Other catalytically active components may be present in the circulating inventory of catalytic material in addition to the cracking catalyst and the $NO_x$ reduction compositions. Examples of such other materials include the octane enhancing catalysts based on zeolite ZSM-5, CO combustion promoters based on a supported noble metal such as platinum, stack gas desulfurization additives, commonly known as $SO_x$ additives, such as DESOX® (magnesium aluminum spinel), vanadium traps and bottom cracking additives, such as those described in Krishna, Sadeghbeigi, op cit and Scherzer, *Octane Enhancing Zeolitic FCC Catalysts*, Marcel Dekker, New York, 1990, ISBN 0-8247-8399-9. These other components may be used in their conventional amounts.

The effect of the present process is to minimize the overall content of $NO_x$ emissions released from a FCC process operating in a heterogeneous combustion mode. Very significant reduction in $NO_x$ emissions may be achieved using the present process, in some cases up to about 90% relative to the base case using a conventional cracking catalyst, at constant conversion, using the preferred form of the $NO_x$ reduction compositions of the invention as described hereinabove. $NO_x$ reduction of 10 to 90% is readily achievable with the process according to the invention, as shown by the Examples below. However, as will be understood by the one skilled in the catalyst art, the extent of $NO_x$ reduction will depend on such factors as, e.g., the composition and amount of the additive utilized; the design and the manner in which the FCCU is operated, including but not limited to oxygen level and distribution of air in the regenerator, catalyst bed depth in the regenerator, stripper operation and regenerator temperature; the properties of the hydrocarbon feedstock cracked; and the presence of other catalytic additives that may affect the chemistry and operation of the regenerator. Thus, since each FCCU is different in some or all of these respects, the effectiveness of the process of the invention may vary from unit to unit.

The scope of the invention is not in any way intended to be limited by the examples set forth below. The examples include the preparation of oxidative additives useful in the process of the invention and the evaluation of the invention process to reduce $NO_x$ and gas phase reduced nitrogen species in a catalytic cracking environment.

To further illustrate the present invention and the advantages thereof, the following specific examples are given. The examples are given as specific illustrations of the invention. It should be understood, however, that the invention is not limited to the specific details set forth in the examples.

All parts and percentages in the examples as well as the remainder of the specification referring to solid material composition or concentration are by weight unless otherwise specified. However, all parts and percentages in the examples as well as the remainder of the specification referring to gas composition are molar or by volume unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited.

EXAMPLES

Example 1

Ferrierite zeolite was exchanged with copper ions using a solid-state exchange procedure as follows: Copper chloride (120 grams, dry basis) was ground into a fine powder and then blended with 1800 g of ferrierite powder. The blend was calcined for 4 hours at 325° C. The calcined blend was slurried with 9000 g of water maintained at 80° C., stirred for 10 minutes and then filtered. The filtercake was washed three times with 80° C. water, dried at 100° C. for 10 hours and then calcined at 593° C. for 1.5 hours. The finished product contained 2.3% Cu.

A composition comprising 65% of the Cu-exchanged ferrierite, 15% clay and 20% alumina sol was prepared by forming an aqueous slurry containing 1522 g of aluminum chlorohydrol solution (23% solids), 1138 g (dry basis) of the Cu-exchanged ferrierite and additional water in an amount sufficient to make a slurry containing about 40% solids. The slurry was milled in a Drais mill to an average particle size of less than 2.5 µm and then spray dried in a Bowen Engineering spray dryer. The spray-dried product was calcined for 1.5 hours at 593° C. The resulting catalyst/additive composition was designated Additive A, and had the following analyses: 65.1% $SiO_2$, 32.2% $Al_2O_3$, 1.49% Cu, 0.12% $Na_2O$, 0.1% $K_2O$ and had a total BET surface area of 246 m²/g.

Example 2

The activity of Additive A for reducing NO emissions from an FCC unit was assessed by using the Davison Circulating Riser (DCR). The DCR has been described in G. W. Young, G. D. Weatherbee, and S. W. Davey, "Simulating commercial FCCU yields with the Davison Circulating Riser (DCR) pilot plant unit," National Petroleum Refiners Association (NPRA) Paper AM88-52; and in G. W. Young, "Realistic Assessment of FCC Catalyst Performance in the Laboratory," in Fluid Catalytic Cracking: Science and Technology, J. S. Magee and M. M. Mitchell, Jr. Eds., Studies in Surface Science and Catalysis, Volume 76, p. 257, Elsevier Science Publishers B.V., Amsterdam 1993, ISBN 0-444-89037-8, which description is herein incorporated by reference.

In this experiment, the DCR was operated at "full burn" conditions, that is with 1% excess $O_2$ in the regenerator, and with the regenerator operating at 705° C. The DCR was initially charged with a blend of 1895.25 g of an equilibrium cracking catalyst having the properties shown in Table 1 below, and 4.75 g of a commercial sample of a Pt-based combustion promoter, CP-3® (obtained from Grace Davison, a unit

TABLE 1

Properties of equilibrium cracking catalyst used in DCR tests as described in Examples 2, 8, 16 and 20.

| | | |
|---|---|---|
| $SiO_2$ | wt. % | 49.01 |
| $Al_2O_3$ | wt. % | 46.05 |
| $RE_2O_3$ | wt. % | 1.44 |
| $Na_2O$ | wt. % | 0.32 |
| $TiO_2$ | wt. % | 1.16 |
| CaO | wt. % | 0.14 |
| Ni | ppm | 1060 |
| V | ppm | 1760 |
| Sb | ppm | 270 |
| SA | $m^2/g$ | 174 |
| Zeolite | $m^2/g$ | 127 | of W. R. Grace & Co.—Conn., Columbia, Md.), which had been deactivated for 20 hours at 788° C. without any added Ni or V using the Cyclic Propylene Steaming method (CPS). The description of the CPS method has been described in L. T. Boock, T. F. Petti, and J. A. Rudesill, "Contaminant-Metal Deactivation and Metal-Dehydrogenation Effects During Cyclic Propylene Steaming of Fluid Catalytic Cracking Catalysts," Deactivation and Testing of Hydrocarbon Processing Catalysts, ACS Symposium Series 634, p. 171 (1996), ISBN 0-8412-3411-6, which description is herein incorporated by reference. A commercial FCC feed having the properties shown in Table 2 below was used in the DCR during these experiments. NO and any $NO_2$ or $N_2O$ emissions were monitored continuously during these experiments using a Model 2030 FTIR multigas analyzer from MKS Online Products.

TABLE 2

Properties of the feed used in DCR tests described in Example 2

| | |
|---|---|
| API Gravity @ 60° F. | 25.5 |
| Sulfur, wt. % | 0.369 |
| Total Nitrogen, wt. % | 0.12 |
| Basic Nitrogen, wt. % | 0.05 |
| Conradson Carbon, wt. % | 0.68 |
| K Factor | 11.94 |

TABLE 2-continued

Properties of the feed used in DCR tests described in Example 2

Simulated Distillation, vol. %, ° F.

| | |
|---|---|
| 5 | 307 |
| 20 | 691 |
| 40 | 782 |
| 60 | 859 |
| 80 | 959 |
| FBP | 1257 |

The DCR was allowed to stabilize and steady state NO emissions data collected, before a blend of 105 g of Additive A, 0.5 g of deactivated CP-3® and 94.5 g of the equilibrium catalyst were injected into it. After the unit stabilized again, the run was continued for approximately 10 hours. The results are recorded in Table 3 below. TOS is time-on-stream from the time of introduction of Additive A into the unit. As shown in Table 3, Additive A is effective for reducing NO emissions from the DCR regenerator. No measurable amounts of $NO_2$ or $N_2O$ were detected.

TABLE 3

Reduction of NO emissions from the regenerator of the DCR when using Additive A

| Additive | Amount (wt. %) | TOS (h) | $NO_x$ (ppm) | $NO_x$ Reduction (%) |
|---|---|---|---|---|
| Catalyst + CP-3 ® CPS | 0.25 | | 173 | |
| Additive A | 5 | 3 | 54 | 69 |
| | 5 | 5 | 66 | 62 |
| | 5 | 8 | 74 | 57 |

Example 3

A microspheroidal particulate support material was prepared as follows: A slurry was prepared from an aqueous slurry having 20% solids of a peptizable alumina (Versal 700 alumina powder obtained from La Roche Industries Inc., 99% $Al_2O_3$, 30% moisture). The alumina slurry was prepared using 31.6 lbs of the alumina. To the alumina slurry 3.87 lbs of an aqueous sodium hydroxide solution (50% NaOH) was added. Then, 10.4 lbs of cerium carbonate crystals (obtained from Rhone Poulenc, Inc., 96% $CeO_2$, 4% $La_2O_3$, 50% moisture) was added to the slurry. The slurry was diluted with a sufficient amount of water to bring the solids concentration at 12%. Finally, 3.38 lbs of exchanged silica sol of Nalco 1140 (obtained from Nalco Chemicals Co.) was added to the slurry. The mixture was agitated to assure good mixing and then milled in a stirred media mill to reduce agglomerates to substantially less than 10 microns. The milled slurry was fed to a 10 ft diameter Bowen Engineering spray drier to form microspheres with a diameter of approximately 70 microns. Thereafter, the spray-dried product was calcined at approximately 650° C. to remove volatiles and provide a final support.

Example 4

Additive B was prepared as follows: A support prepared as described in Example 3, with the exception that the inputs were adjusted to yield a final product having the composition as shown below was impregnated with a Pd containing solution prepared by dissolving in 45 lbs of water 549 g of a Pd (II) nitrate solution obtained from Johnson-Mathey, which contained 8.643% Pd. One hundred pounds of the support were then placed in an Eirich mixer. With the Eirich mixer in operation, the Pd containing solution was sprayed on the support. The impregnated material was then discharged from the Eirich mixer and flash-dried in a Bowen Engineering flash drier with the inlet temperature set at 538° C., and the outlet set at 149° C. The resulting material contained: 69.7% $Al_2O_3$, 21.8% $CeO_2$, 5.64% $Na_2O$, 4.72% $SiO_2$, 970 ppm Pd and had a BET surface area of 160 $m^2/g$.

Example 5

The activity of Additive B for reducing NO emissions from the FCCU regenerator was assessed by measuring the activity for catalyzing the reduction of NO by CO in a Regenerator Test Unit (RTU). The RTU is an apparatus specifically designed to simulate the operation of an FCCU regenerator. The RTU is described in detail in G. Yaluris and A. W. Peters "Studying the Chemistry of the FCCU Regenerator Under Realistic Conditions," Designing Transportation Fuels for a Cleaner Environment, J. G. Reynolds and M. R. Khan, eds., p. 151, Taylor & Francis, 1999, ISBN: 1-56032-813-4, which description is herein incorporated by reference. After calcination for 2 hours at 593° C., the additive was blended at 0.5% level with a FCC catalyst, OCTACAT®-DCH obtained from Grace Davison, which had been deactivated for 4 hours at 816° C. in a fluidized bed reactor with 100% steam. The cracking catalyst alone or the blend was then fed to the RTU reactor operating at 700° C. The gas feed to the reactor was a mixture containing 5000-5500 ppm CO, 500-550 ppm NO, various amounts of oxygen added as 4% $O_2/N_2$, and the balance nitrogen. The total gas feed rate excluding the $O_2$ containing gas feed was 1000-1100 sccm. The amount of oxygen during this experiment was varied so that the conditions in the RTU reactor would simulate reducing and oxidizing areas of an FCCU regenerator. The results are shown in FIG. 1. The data shows that Additive B is very effective in reducing NO emissions.

Example 6

A Cu-containing solution was prepared containing 7.5 lbs of copper sulfate crystals dissolved in 45 lbs of DI water maintained at 49° C. A support was prepared as described in Example 3, with the exception that the inputs were adjusted to yield a final product having the composition as shown below. Approximately 100 lbs of the support was placed in an Eirich mixer. The Cu solution was sprayed onto the support at a rate of 550 cc/min. The impregnated material was then discharged and subsequently flash-dried with an outlet temperature of 149° C. and an inlet temperature of 538° C. The resulting material, designated Additive C, contained, 69.7% $Al_2O_3$, 21.8% $CeO_2$, 5.64% $Na_2O$, 4.72% $SiO_2$, 1.9% Cu and had a BET surface area of 160 $m^2/g$.

Example 7

DCR tests were carried out to evaluate the NO reduction performance of Additive C. The properties of the feed used for this experiment are shown in Table 4. The DCR was operated at full combustion mode with the regenerator at 705° C. and with 1% excess $O_2$ in the regenerator flue gas. The DCR was started up by charging the unit with a blend of 1895.25 g of a commercially available cracking catalyst, SUPERNOVA®-DMR+ (obtained from Grace Davison), which was hydrothermally deactivated in a fluidized bed reactor with 100% steam for 4 hours at 816° C., and 4.75 g of CP-3®, which had been deactivated for 20 hours at 788° C. without any added Ni or V using the CPS method. After stabilization of the unit, the baseline NO emissions data were collected using an on-line Lear-Siegler $SO_2/NO_x$ Analyzer (SM8100A). Subsequently, a blend of 0.25 g of steam-deactivated CP-3®, 89.75 g of the steam-deactivated SUPERNOVA®-DMR+ catalyst and 10 g of Additive C, was injected into the DCR and after the unit stabilized again the NO emissions data were collected. The results are shown in Table 5 below. TOS is time-on-stream from the time of addition of CP-3® to the unit. As shown in Table 5, Additive C is effective for reducing $NO_x$ emissions from the DCR regenerator.

TABLE 4

Properties of the feed used in DCR tests described in Examples 7, 8 and 16

| API Gravity @ 60° F. | 23.2 |
|---|---|
| Sulfur, wt. % | 0.023 |
| Total Nitrogen, wt. % | 0.13 |
| Basic Nitrogen, wt. % | 0.04 |
| Conradson Carbon, wt. % | 0.03 |
| K Factor | 11.4 |
| Simulated Distillation, vol. %, ° F. | |
| 5 | 453 |
| 20 | 576 |
| 40 | 660 |
| 60 | 743 |
| 80 | 838 |
| FBP | 1153 |

TABLE 5

Reduction of DCR NOx emissions when using Additive C

| Additive | Amount (wt. %) | TOS (h) | $NO_x$ (ppm) | $NO_x$ Reduction (%) |
|---|---|---|---|---|
| Catalyst + CP-3 ® CPS | 0.25 | | 303 | |
| Additive C | 0.5 | 3.0 | 203 | 33 |

Example 8

DCR experiments were carried out to evaluate the NO reduction performance of a commercially available sample of a Mg—Al spinel containing additive, DESOX® obtained from Grace Davison and designated as Additive D. The feed used for this experiment was the same as the feed used in Example 7. The DCR was operated at full combustion mode with a regenerator temperature of 705° C. and 1% excess $O_2$. The DCR was started up by charging the unit with a blend of 1895.25 g of an equilibrium cracking catalyst having the properties shown Table 1, and 4.75 g of CP-3® (obtained from Grace Davison), which had been deactivated for 20 hours at 788° C. without any added Ni or V using the CPS method. After stabilization of the unit, the baseline NO emissions data were collected using a MKS Online Products FTIR Multigas analyzer (Model 2030). Subsequently, a blend of 10 g of Additive D, 89.75 g of the equilibrium cracking catalyst and 0.25 g of the CPS-deactivated CP-3®, was injected into the DCR. NO emissions data were continuously collected for 3 additional hours. As shown in Table 6 below, Additive D is effective for reducing $NO_x$ emissions from the DCR regenerator.

TABLE 6

Reduction of DCR NOx emissions when using Additive D

| Additive | Amount (wt. %) | TOS (h) | $NO_x$ (ppm) | $NO_x$ Reduction (%) |
|---|---|---|---|---|
| Catalyst + CP-3 ® CPS | 0.25 | | 112 | |
| Additive D | 0.5 | 3.0 | 68 | 39 |

Example 9

A Fe-containing solution was prepared containing 140.5 g of ferric nitrate dissolved in 300 g DI water. A support was prepared as described in Example 3, with the exception that the inputs were adjusted to yield a final product having the composition as shown below. Five hundred grams of the support was placed in an inclined beaker on a mechanical rotator. The support was then impregnated by gradually spraying with the ferric nitrate solution from a hand pumped spray bottle. The wet impregnated material was dried in an oven at 200° C. for 2 hours. The dried cake was in the form of large chunks and was first ground in a blender and screened before calcining at 650° C. for 2 hours to decompose the nitrates and remove volatiles. The resulting material, designated as Additive E, contained: 56.1% $Al_2O_3$, 20.5% $CeO_2$, 7.56% $Na_2O$, 7.5% $SiO_2$, 5.4% $Fe_2O_3$ and a BET surface area of 103 $m^2$/g.

Example 10

DCR experiments were carried out to evaluate the NO reduction performance of Additive E. The properties of the feed used for these experiments are shown in Table 7 below. The DCR was operated under full combustion mode at a regenerator temperature of 705° C. and with 1% excess $O_2$. The DCR was started up with 1900 g of an equilibrium cracking catalyst having the properties shown in Table 8. After stabilization of the unit, 95 g of the equilibrium cracking catalyst and 5 g of CP-3®, which had been deactivated for 20 hours at 788° C. without any added Ni or V using the CPS method were injected into the DCR. After stabilization of the unit, the baseline NO emissions data was collected using an on-line Lear-Siegler $SO_2/NO_x$ Analyzer (SM8100A). Subsequently, a blend of 0.25 g of steam-deactivated CP-3®, 89.25 g of the equilibrium cracking catalyst and 10.5 g of Additive E, was injected into the DCR. The results are shown in Table 8 below. TOS is time-on-stream from the time of addition of Additive E to the unit. As shown in Table 9 below, Additive E is effective for reducing $NO_x$ emissions from the DCR regenerator.

TABLE 7

Properties of the feed used in DCR tests described in Example 10

| API Gravity @ 60° F. | 22.8 |
|---|---|
| Sulfur, wt. % | 0.23 |
| Total Nitrogen, wt. % | 0.19 |
| Basic Nitrogen, wt. % | 0.083 |
| Conradson Carbon, wt. % | 1.44 |
| K Factor | 11.65 |
| Simulated Distillation, vol. %, ° F. | |
| 5 | 464 |
| 20 | 651 |
| 40 | 764 |
| 60 | 854 |
| 80 | 963 |
| FBP | 1365 |

TABLE 8

Properties of equilibrium cracking catalyst used in Example 10.

| $SiO_2$ | wt. % | 50.9 |
|---|---|---|
| $Al_2O_3$ | wt. % | 45.5 |
| $RE_2O_3$ | wt. % | 0.37 |
| $Na_2O$ | wt. % | 0.37 |
| Ni | ppm | 681 |
| V | ppm | 1160 |
| SA | $m^2$/g | 168 |
| Zeolite | $m^2$/g | 128 |

TABLE 9

Reduction of $NO_x$ emissions from the DCR Regenerator when using Additive E

| Additive | Amount (wt. %) | TOS (h) | $NO_x$ (ppm) | $NO_x$ Reduction (%) |
|---|---|---|---|---|
| Catalyst | | | 27 | |
| CP-3 ® CPS | 0.25 | | 249 | |
| Additive E | 0.5 | 3.0 | 191 | 23 |

Example 11

Additive F was made by preparing 100.0 g of a support as in Example 3, except that the inputs were adjusted to yield a final product having the composition shown below, placing the support in an inclined beaker on a mechanical rotator. A Rh impregnating solution was prepared by diluting with DI water 0.5 g of a 10% Rh nitrate salt solution to 100.0 g. The support was then impregnated gradually by spraying with 100.0 g of the dilute Rh solution through a hand-held pipette. The wet impregnated material was dried in an oven at 120° C. over night. The dried cake was in the form of large chunks and was first ground through a screen before calcining at 650° C. for two hours to decompose the nitrates and remove volatiles. The resulting material contained: 65.3% $Al_2O_3$, 9.6% $SiO_2$, 21.3% $CeO_2$, 5% $Na_2O$, 437 ppm Rh, and had a BET surface area of 140 $m^2$/g.

Example 12

Figure 2:
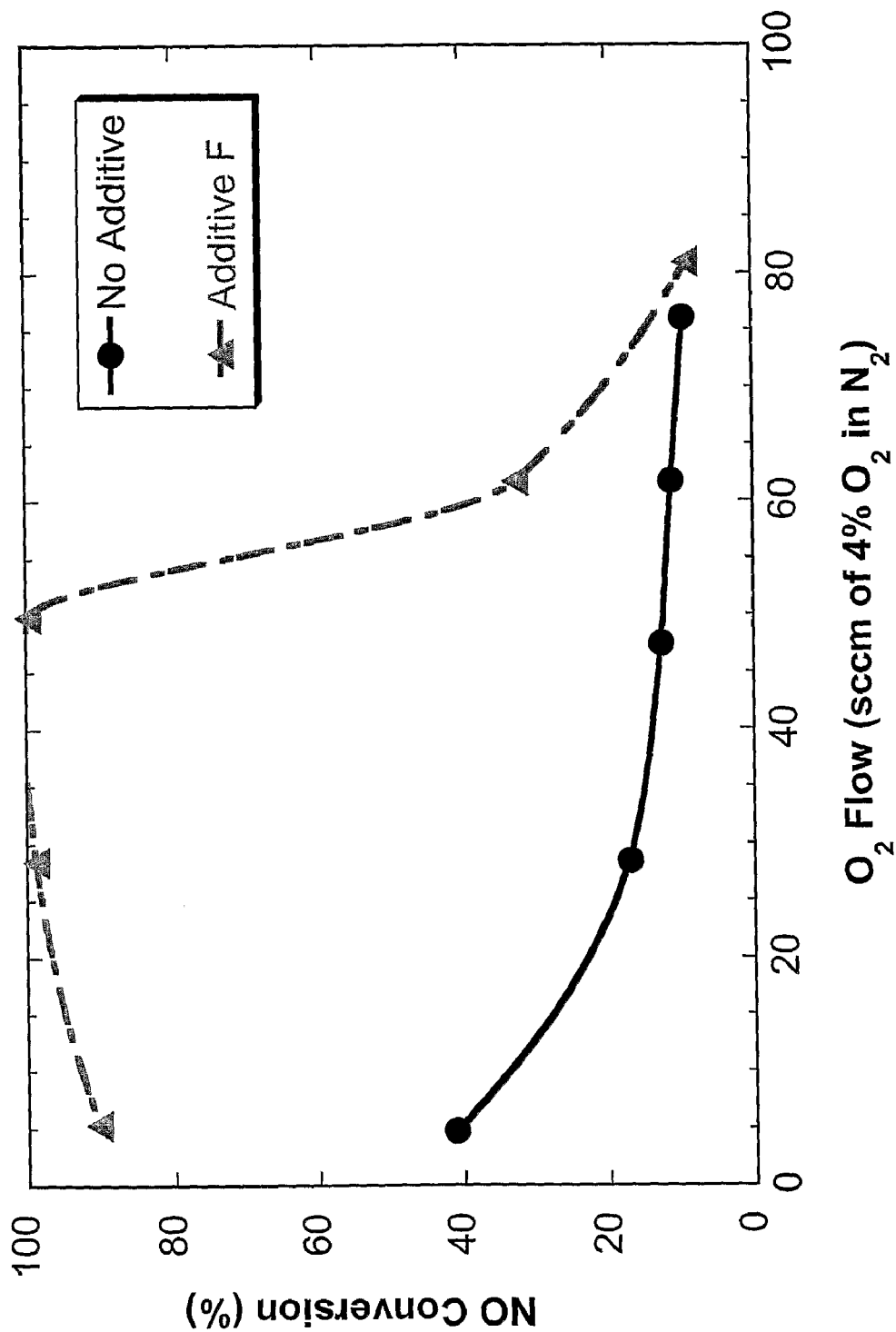
FIG. 2 is a graphic representation of NO conversion in the RTU where NO reacts with CO at various levels of oxygen in a reactor feed in the presence of Additive F.

The activity of Additive F for reducing NO emissions from the FCCU regenerator was assessed by measuring the activity for catalyzing the reduction of NO by CO in a Regenerator Test Unit (RTU) using the same procedure as in Example 5. The results are shown in FIG. 2 below. The data show that Additive F is very effective in reducing NO emissions.

Example 13

A composition, designated as Additive G, was prepared using the base material prepared in Example 3 with the exception that the inputs were adjusted to yield a final product having the composition shown below. Eighty grams of the base material was placed in an inclined beaker on a mechanical rotator. A master Rh solution was prepared by diluting with DI water 1.0098 g of a 10% Rh nitrate salt solution to 77.48 g. The base material was then impregnated by gradually spraying with 60 g of the dilute Rh solution through an air mist spray nozzle system. The wet impregnated material was dried in an oven at 120° C. overnight. The dried cake was in the form of large chunks and was first ground in a blender and screened before calcining at 650° C. for two hours to decompose the nitrates and remove volatiles. The resulting material contained; 73.2% $Al_2O_3$, 4.5% $SiO_2$, 5.1% $Na_2O$, 17.5% $CeO_2$, 1005 ppm Rh and had a BET surface area of 127 $m^2/g$.

Example 14

Figure 3:
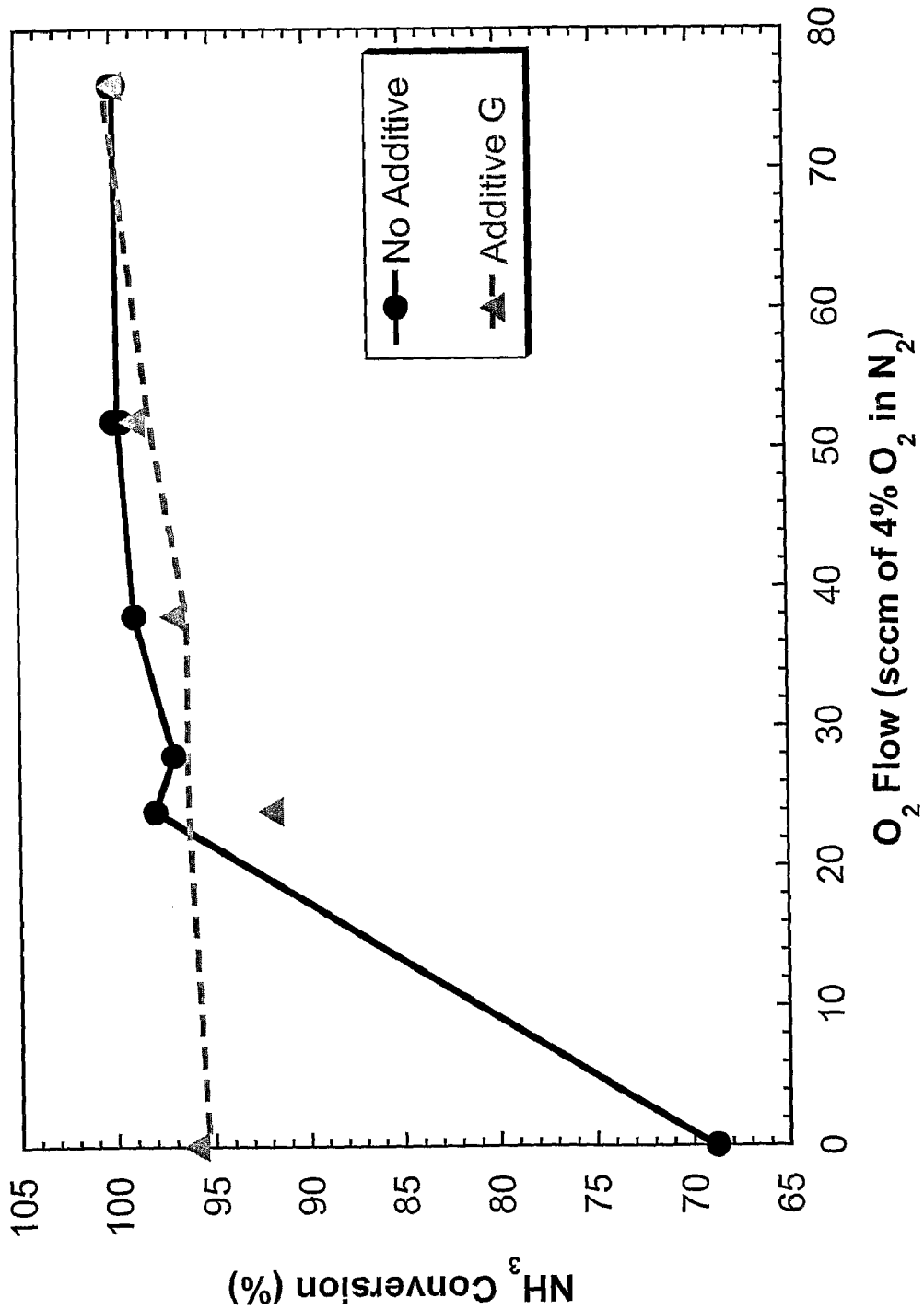
FIG. 3 is a graphic representation of ammonia reduction in the RTU where ammonia reacts with CO at various levels of oxygen in a reactor feed in the presence of Additive G.
Figure 4:
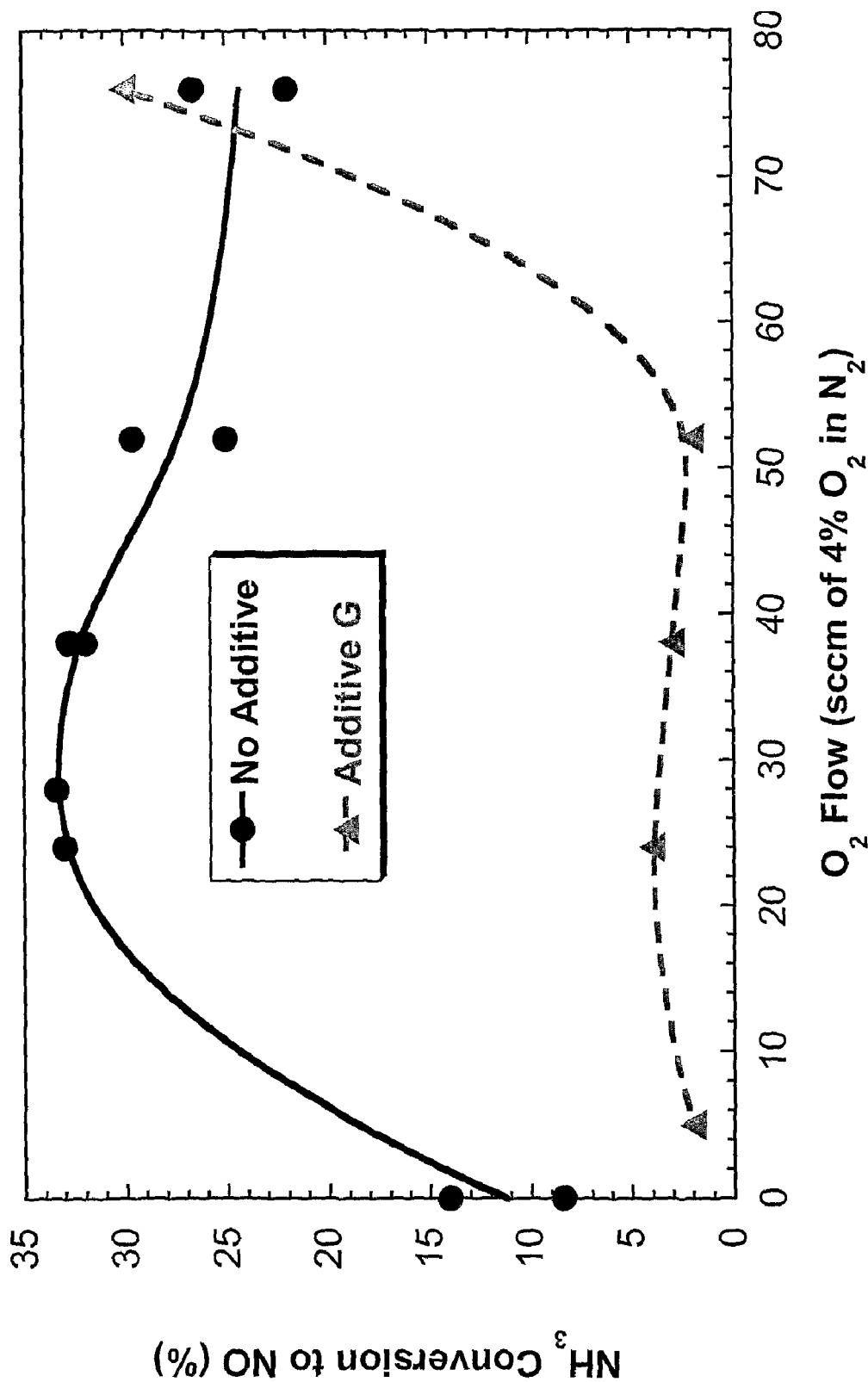
FIG. 4 is a graphic representation of ammonia conversion to NO in the RTU where ammonia reacts with CO at various levels of oxygen in a reactor feed in the presence of Additive G.

The activity of Additive G to reduce $NH_3$ emissions from an FCC unit regenerator operating in partial burn or incomplete combustion was compared to the activity of the cracking catalyst alone. The experiments were conducted by reacting in the RTU reactor $NH_3$ with CO at various levels of $O_2$. After calcination for 2 hours at 595° C., the additive was blended at 0.5% level with a commercially available FCC catalyst (OCTACAT®-DCH, obtained from Grace Davison), which had been deactivated for 4 hours at 816° C. in a fluidized bed reactor with 100% stream. The cracking catalyst alone, or the additive/cracking catalyst blend were separately fed to the RTU reactor operating at 700° C., The gas feed to the RTU was a mixture of $NH_3$ and CO containing approximately 600 ppm $NH_3$, 5000-5500 ppm CO, various amounts of $O_2$ added as 4% $O_2$ in $N_2$, with the balance being nitrogen. The total gas feed rate excluding the $O_2$ containing gas feed was 1000-1100 sccm. The results are recorded in FIGS. 3 and 4 below, which show that Additive G is very effective in minimizing $NH_3$ emissions and preventing its conversion to $NO_x$. No other nitrogen oxides (e.g., $NO_2$ or $N_2O$) were detected, indicating the conversion of $NH_3$ to molecular nitrogen.

Example 15

An aqueous slurry was prepared which contained 6521 g of aluminum chlorohydrol solution (23% solids), 4500 g (dry basis) of ferrierite ($SiO_2/Al_2O_3$=20, $Na_2O+K_2O$<0.2) and enough additional water to make a slurry which contained about 40% solids. The slurry was milled, in a Drais mill, to an average particle size of less than 2.5 μm and then spray dried in a Bowen spray dryer. The spray-dried product was calcined for 90 minutes at 593° C. About 158 g of calcined product was placed in an inclined beaker on a mechanical rotator. A master Rh solution was prepared by diluting 1.001 g 9% Rh from nitrate salt to 100 g with DI water. The calcined product was then impregnated by gradually spraying on it 16.7 g of the dilute Rh solution further diluted with 75 g DI water, targeting a concentration of 100 ppm Rh on the finished catalyst. The wet impregnated catalyst was dried for 1 hour at 99° C. and then calcined for 1 hour at 593° C. The resulting material was designated as Additive H, had the following analysis: 71.4% $SiO_2$, 28.3% $Al_2O_3$, 0.1% $Na_2O$, 0.1% $K_2O$ and had a total BET Surface Area of 328 $m^2/g$.

Example 16

Additive H was evaluated in the DCR under partial burn conditions. The feed used for this test had the properties shown in Table 4. The DCR was charged initially with approximately 1900 g of an equilibrium cracking catalyst having the properties shown in Table 1. The flow rate of air to the DCR regenerator was adjusted so as to achieve a $CO_2$/CO ratio of 7.0 in the regenerator flue gas. After stabilization of the unit, the baseline flue gas $NH_3$ emissions data were collected using a MKS Online Products FTIR multigas analyzer (2030). Subsequently, 100 g of a blend containing 10 g of Additive H and 90 g of the equilibrium cracking catalyst was injected into the DCR and $NH_3$ emissions were continuously collected for 3.8 h. No increase in NO emissions was detected upon injection of Additive H. The results presented in Table 9 show that Additive G is effective in reducing $NH_3$ emissions even at 0.5 wt % of the overall catalyst inventory.

TABLE 10

Reduction of $NH_3$ Emissions from the DCR Regenerator when using Additive G

| Additive | Amount (wt. %) | TOS (h) | $NH_3$ (ppm) | $NH_3$ Reduction (%) |
|---|---|---|---|---|
| Catalyst | | | 128 | |
| Additive F | 0.5 | 1.5 | 69 | 46 |

Example 17

Additive I was prepared by first making a composition using the procedure in Example 6 except that the inputs were adjusted to yield a final product having the composition: $SiO_2$ 7.8%, $Na_2O$ 7.1%, $CeO_2$ 18.5%, $Al_2O_3$ 60.2%, 1.9% Cu and a BET SA of 111 $m^2/g$. Approximately 80 g of this composition were placed in an inclined beaker on a mechanical rotator. A master Rh solution was prepared by diluting with DI water 1.0098 g of a 10% solution of Rh nitrate to 77.48 g. A further dilution was applied by removing 5.83 g of the previously made master solution and adding DI water to obtain a total weight of 60 g. The composition was then impregnated by gradually spraying with 60 g of the latter dilute Rh solution through an air mist spray nozzle system. The wet impregnated material was dried in an oven at 120° C. overnight. The dried cake was in the form of large chunks and was first ground in a blender and screened before calcining at 650° C. for two hours to decompose the nitrates and remove volatiles. The resulting material contained: 57.9% $Al_2O_3$, 7.7% $SiO_2$, 7% $Na_2O$, 17.7% $CeO_2$, 1.8% Cu, 90 ppm Rh and had a BET surface area of 107 $m^2/g$.

Example 18

Figure 5:
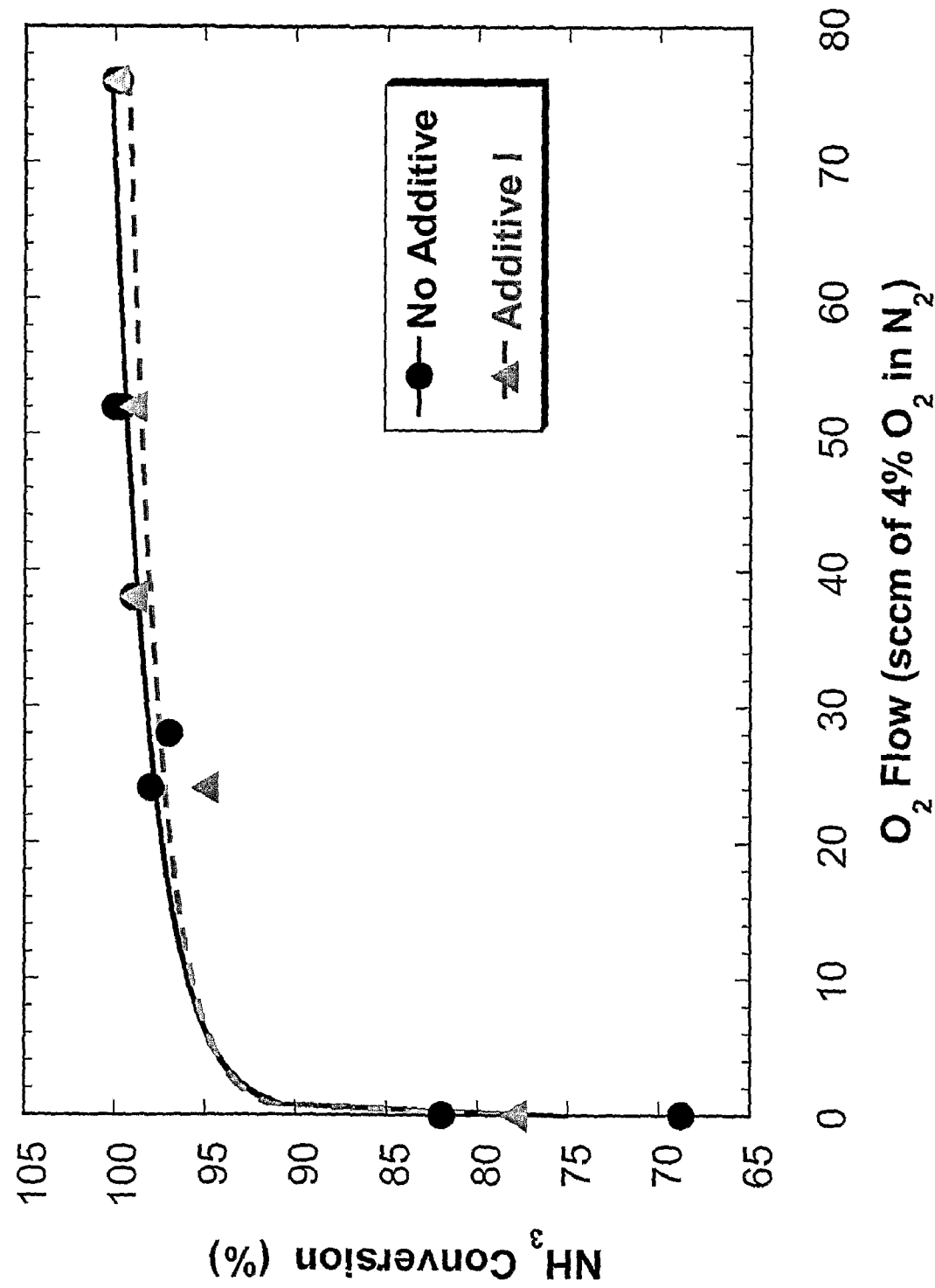
FIG. 5 is a graphic representation of ammonia conversion in the RTU where ammonia reacts with CO at various levels of oxygen in a reactor feed in the presence of Additive I.
Figure 6:
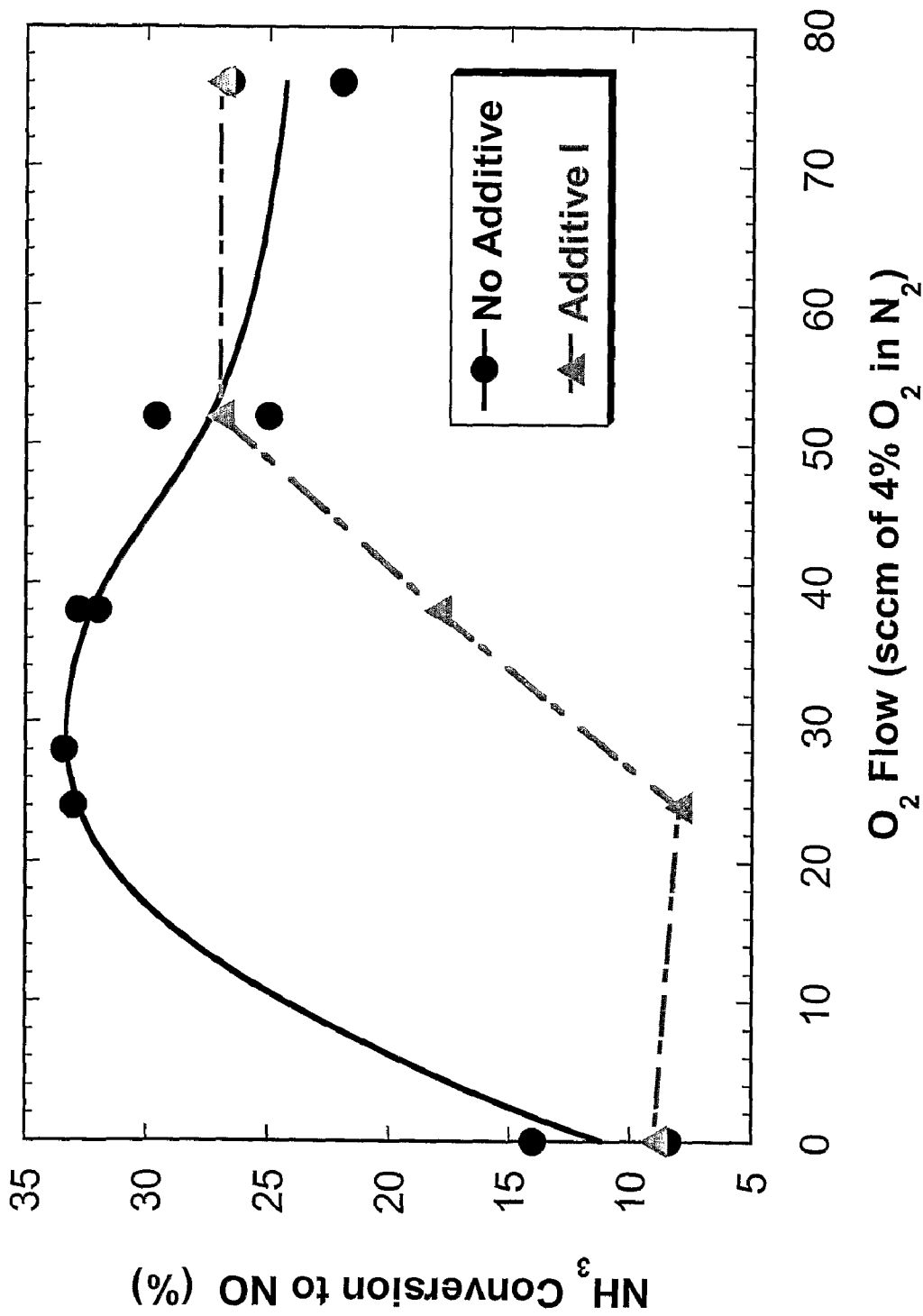
FIG. 6 is a graphic representation of ammonia conversion to NO in the RTU where ammonia reacts with CO at various levels of oxygen in a reactor feed in the presence of Additive I.

The activity of Additive I for decreasing the emissions of reduced nitrogen species, e.g., $NH_3$, was assessed by measuring the activity to convert $NH_3$ to $N_2$ in the RTU in the presence of CO at various oxygen levels, using the procedure described in Example 14. As shown in FIGS. 5 and 6, Additive I is effective in removing gas phase reduced-nitrogen species, like $NH_3$, while preventing their conversion to NO at low oxygen levels. In terms of preventing NO formation, its activity is superior to that of the catalyst alone.

Example 19

About 100 g of a commercial Mg—Al spinel containing material (DESOX® obtained from Grace Davison) was placed in an inclined beaker on a mechanical rotator. A Rh solution was prepared by dissolving 0.08 g of Rh nitrate salt (12.11% Rh) into 95.0 g of DI water. The support was then impregnated by gradually dropping all 95.0 g of the diluted Rh solution with a pipette. The wet impregnated material was dried at 120° C. overnight. The dried cake was in the form of large chunks and was crushed through a 100 mesh screen before calcining at 650° C. for two hours to decompose the nitrates and remove volatiles. The resulting composition was designated as Additive J, and had an analyses of 12.9% $CeO_2$, 35.6% MgO, 46.2% $Al_2O_3$, about 1.3% V and 133 ppm Rh, with a BET surface area of 133 $m^2/g$.

Example 20

Additive J was evaluated in the DCR under partial burn conditions for its ability to reduce $NH_3$ emissions in a FCCU. The properties of the feed used for this test are shown in Table 11. The DCR was charged initially with approximately 1800 g of an equilibrium cracking catalyst having the properties shown in Table 1. The flow rate of air to the DCR regenerator was adjusted so as to achieve a $CO_2/CO$ ratio of 7.0 in the regenerator flue gas. After stabilization of the unit, the baseline $NH_3$ emissions data was collected using a MKS Online Products FTIR multigas analyzer (2030). Subsequently, 100 g of a blend containing 9.5 g of Additive I, which had been deactivated for 20 hours at 788° C. without any added Ni or V using the CPS method, and 90.5 g of the equilibrium cracking catalyst, was injected into the DCR and $NH_3$ emissions were continuously collected for 4 h. The results in Table 12, show that Additive J is effective in reducing $NH_3$ emissions even at 0.5 wt. % of the overall catalyst inventory. No increase in NO emissions was detected upon injection of Additive J. These data suggest that Additive J is effective in converting reduced nitrogen species to molecular $N_2$ in a FCCU regenerator.

TABLE 11

Properties of feed used in the DCR experiments of Example 20

| | |
|---|---|
| APT Gravity @ 60° F. | 24.2 |
| Sulfur, wt. % | 1.014 |
| Total Nitrogen, wt. % | 0.11 |
| Basic Nitrogen, wt. % | 0.0448 |
| Conradson Carbon, wt. % | 0.36 |
| K Factor | 11.87 |
| Simulated Distillation, vol. % ° F. | |
| IBP | 306 |
| 5 | 539 |
| 20 | 707 |
| 40 | 795 |
| 60 | 858 |
| 80 | 935 |
| FBP | 1179 |

TABLE 12

Reduction of $NH_3$ emissions from the DCR regenerator when using Additive J

| Additive | Amount (wt. %) | TOS (h) | $NH_3$ (ppm) | $NH_3$ Reduction (%) |
|---|---|---|---|---|
| Catalyst | | | 264 | |
| Additive J | 0.5 | 4 | 161 | 39 |

Example 21

A hydrotalcite base having 36.6% total volatiles, and approximately 66% MgO, 30% $Al_2O_3$, and a BET surface area of 235 $m^2/g$ was obtained as a fine 425 mesh powder from a laboratory preparation made as follows. A mixture containing 70.3 g of MgO, 32.1 g of Porocel AP-15 amorphous rho phase hydrous aluminum oxide, and 470 g of water was aged for 24 hours at 100° C. Multiple batches were made to accumulate several hundred grams of the hydrotalcite product. The fine friable hydrotalcite powder needed to be bound and agglomerated so it was suitable for testing in a fluidized bed reactor. Ceria was also added to the composition. The binding of the hydrotalcite powder and the incorporation of ceria were accomplished by impregnating 79 g as-is weight of hydrotalcite base with a solution containing 15.1 g of cerium nitrate equivalent to 6 g of $CeO_2$, 28.9 g of aluminum chlorohydrol solution having 20.9% $Al_2O_3$, and sufficient water to render the hydrotalcite base at incipient wetness. The resulting support was then dried in a ceramic dish in an oven overnight at 200 C. The dried hydrotalcite base was subsequently crushed though a 100 mesh screen and calcined for 2 hours at 650° C. The resulting hydrotalcite base was then impregnated with 45 g of a solution containing 0.05 g of Rh from rhodium nitrate salt (12.11% Rh) targeting 100 ppm Rh on the finished catalyst. The wet material was again dried overnight in a ceramic dish at 200° C. and crushed through a 100 mesh screen followed by calcination for 2 hours at 650° C. The material was further agglomerated by compacting in a small pellet press and screening through a 100 mesh screen. The final composition was designated as Additive K and had the following analyses: 52.9% MgO, 33.4% $Al_2O_3$, 10.4% $CeO_2$ and a BET surface area of 164 $m^2/g$.

Example 22

Figure 7:
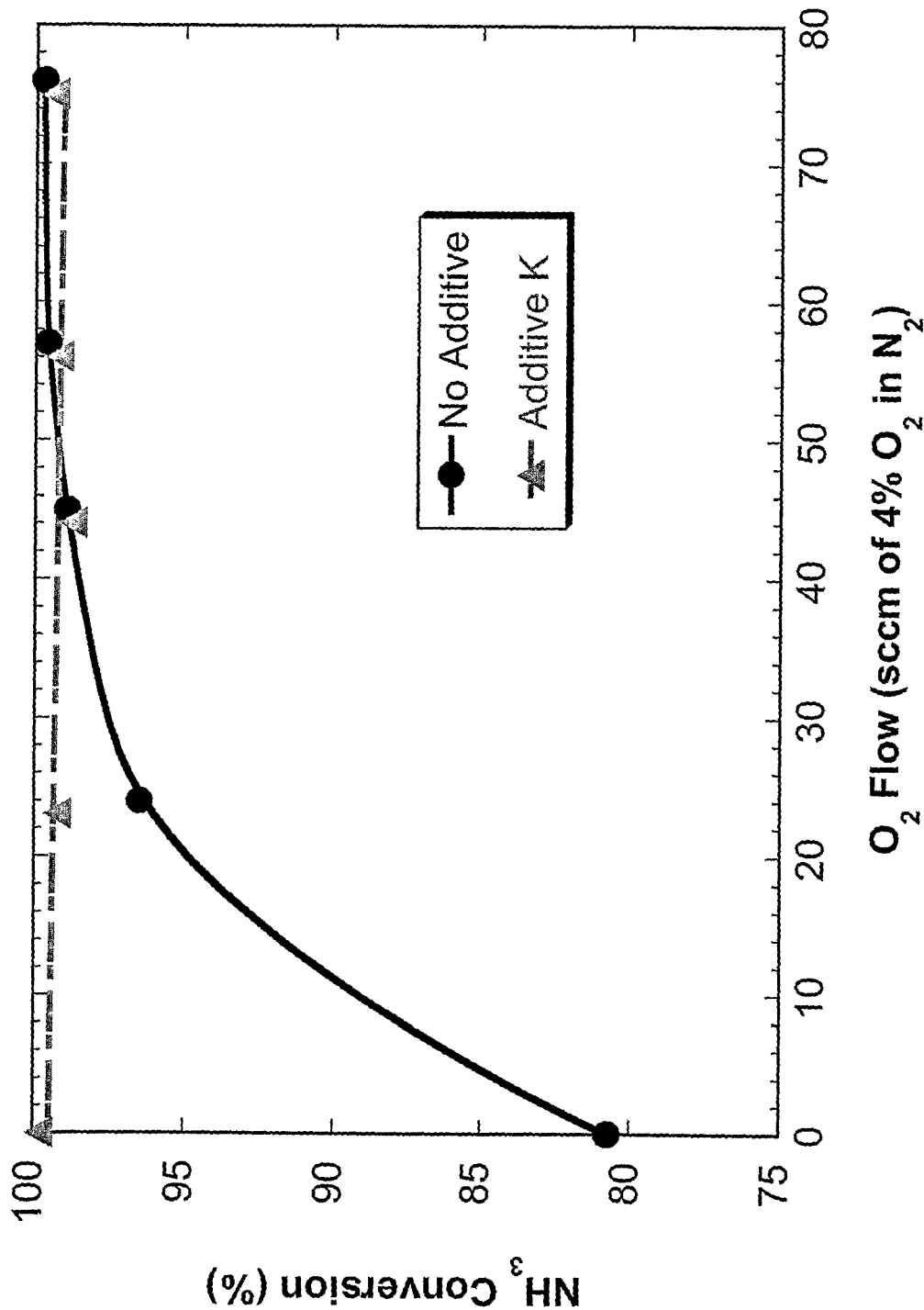
FIG. 7 is a graphic representation of ammonia reduction in the RTU where ammonia reacts with CO at various levels of oxygen in a reactor feed in the presence of Additive K.
Figure 8:
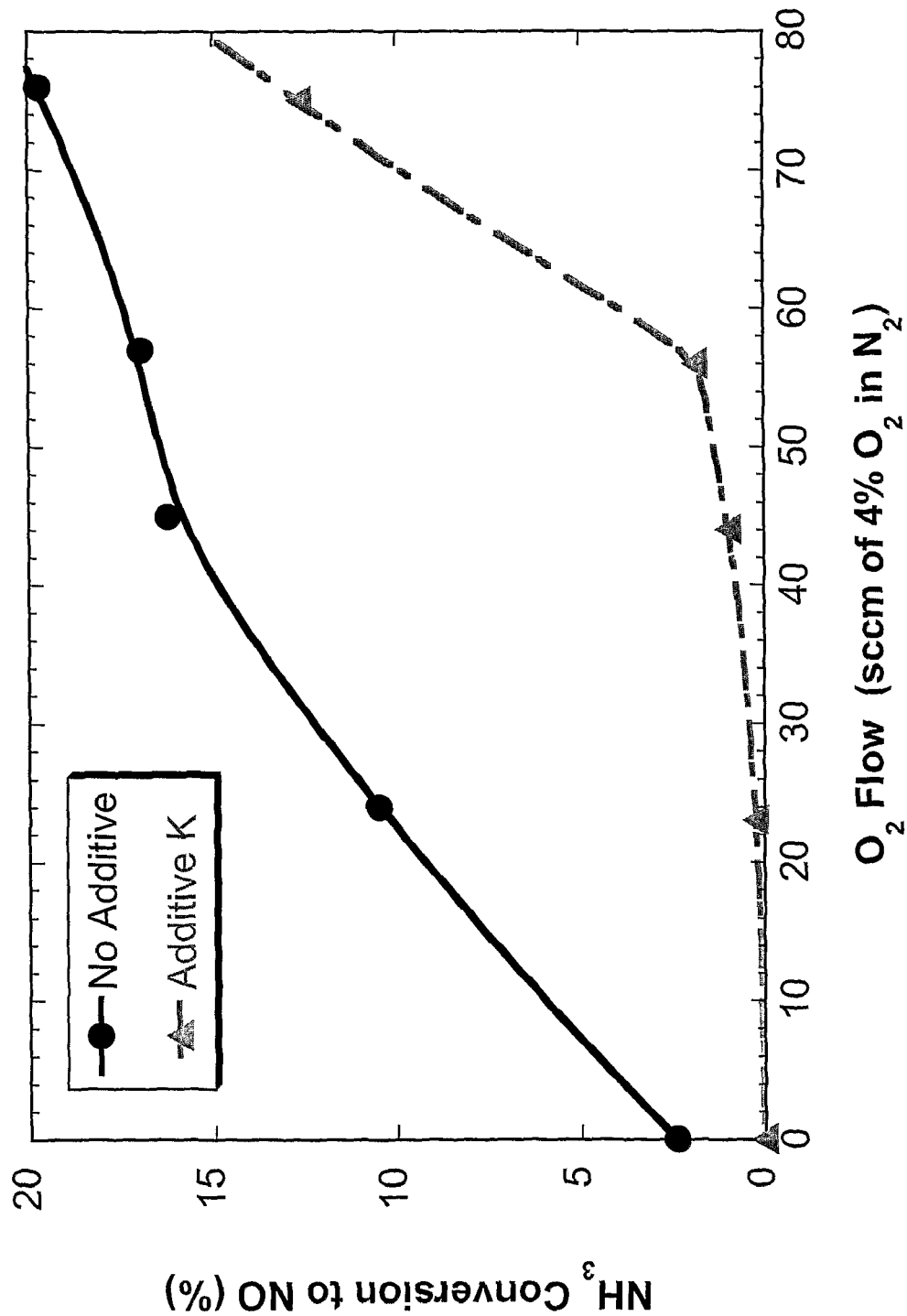
FIG. 8 is a graphic representation of ammonia conversion to NO in the RTU where ammonia reacts with CO at various levels of oxygen in a reactor feed in the presence of Additive K.

The activity of Additive K for decreasing the emissions of reduced nitrogen species, e.g., $NH_3$, was assessed by measuring the activity to convert $NH_3$ to $N_2$ in the RTU in the presence of CO at various oxygen levels, using the procedure described in Example 14. As shown in FIGS. 7 and 8, Additive K is effective in removing gas phase reduced-nitrogen species like $NH_3$ and preventing their conversion to NO.

Example 23

Additive L was prepared in accordance with U.S. Pat. No. 6,358,881 B1. The additive had the following analyses: 5.8% total volatiles, and approximately $SiO_2$ 4.9%, $Na_2O$ 4.9%, $CeO_2$ 21.2%, $Al_2O_3$ 68.7%, 970 ppm Pd, and BET surface area of 167 $m^2/g$ and a mean particle size of 90 μm.

Example 24

The activity of the Additive L for removal of HCN from an FCCU regenerator was compared to the activity of the cracking catalyst alone and a commercial platinum-containing combustion promoter, CP®-5 (platinum on alumina) sold by Grace Davison, a business unit of W.R. Grace & Co.—Conn., Columbia, Md.

The cracking catalyst was deactivated for 4 hrs at 816° C. in a fluidized bed reactor with 100% steam, and coked in a DCR. After being coked in the DCR the catalyst had a composition of 31.6% $Al_2O_3$, 2.4% $RE_2O_3$, 0.45% $Na_2O$, 0.65% $TiO_2$, 0.5% $Fe_2O_3$, 1.3% $P_2O_5$, with the balance silica, and contained 1.5 wt % coke.

About 20 g of the coked cracking catalyst alone, with the Additive L or the combustion promoter added at 0.5 wt % was loaded in the RTU. The gas flow to the RTU reactor was about 800 sccm, containing about 5% $O_2$ with the balance $N_2$. Following an experimental procedure commonly known to those skilled in the art as Temperature-Programmed Oxidation or TPO, and starting from room temperature, the reactor was heated up to about 780° C. by raising the temperature at a rate of about 9° C./min, while continuously flowing the aforementioned gas into the RTU reactor. During this experiment the carbon, hydrogen, nitrogen and sulfur containing coke species were gradually burnt releasing $CO_2$, CO, $SO_2$, reduced nitrogen species like HCN, NO and some $N_2O$. By integrating the detector signal over the duration of the TPO experiment we were able to measure the amount of the various gas phase species made. The results are recorded in Table 13 below:

TABLE 13

Integrated amount of nitrogen species detected in the RTU reactor effluent (a.u.) during TPO of coked cracking catalyst.

| Species | Cracking Catalyst | CP®-5 | Additive L |
|---|---|---|---|
| HCN | 29066 | 8475 | 7038 |
| NO | 3966 | 36165 | 24476 |
| $N_2O$ | 3583 | | |

Example 25

Commercial quantities of a $NO_x$ reduction component, Additive M, and a reduced nitrogen species component, Additive N were prepared according to the methods described in Examples 4 and 13, respectively, except that the inputs were adjusted to yield a final product having the different and distinct compositions shown in the Table 14 below.

TABLE 14

| | | Additive M | Additive N |
|---|---|---|---|
| $SiO_2$ | wt. % | 73 | 77 |
| $Al_2O_3$ | wt. % | 65.7 | 65.1 |
| $Ce_2O_3$ | wt. % | 21.0 | 21.5 |
| $Na_2O$ | wt. % | 6.0 | 5.3 |
| Pd | ppm | 1065 | |
| Rh | ppm | | 530 |
| SA | $m^2/g$ | 124 | 122 |

Additives M and N were tested simultaneously in a commercial FCC unit having a regenerator operating nominally in partial burn, having a heterogeneous combustion mode. The presence of combustion heterogeneities in the unit regenerator was clearly evidenced from the existence of afterburn, which in order to control required the use of a conventional (e.g., Pt on alumina base) CO combustion promoter. Additional evidence of combustion heterogeneities in the regenerator is provided in the Table 15 below. The flue gas exiting this partial burn regenerator contained both more than 0.1% $O_2$ and more than 1% CO. A CO boiler was utilized in this unit, which converts the CO to $CO_2$ before it is emitted to the atmosphere. Any reduced nitrogen species in the regenerator flue gas would also be converted to $NO_x$ in the CO boiler.

TABLE 15

| | Excess $O_2$, mol % | CO, mol % | Afterburn, ° F. | Stack $NO_x$, ppm |
|---|---|---|---|---|
| Baseline 89 days | 0.30 | 1.30 | 25.2 | 122.6 |
| Both Additives 46 days | 0.18 | 1.59 | 38.9 | 41.2 |

For this test, the baseline conditions and $NO_x$ emissions were obtained and then additions of the conventional CO combustion promoter were stopped. The $NO_x$ reduction component, Additive M, was added to the unit in an amount which was about 0.35 wt% of the daily fresh cracking catalyst additions. The reduced nitrogen species component, Additive N, was also added to the unit in an amount which was about 0.7% of the daily fresh cracking catalyst additions. As shown in the Table 15, after enough time elapsed to allow for the conventional CO promoter to decay and the unit catalyst inventory to contain Additives M and N, the $NO_x$ emissions at the unit stack were reduced from about 123 ppm to about 41 ppm, a 66% reduction of the unit $NO_x$ emissions.

These results demonstrated that the process of using a combination of a $NO_x$ reduction component with a reduced nitrogen species component in an FCC unit having a regeneration zone operating under a heterogeneous combustion mode is highly effective for reducing overall $NO_x$ emissions from the unit.

We claim:

1. A process of reducing $NO_x$ emissions from a regeneration zone during a fluid catalytic cracking of a hydrocarbon feedstock into lower molecular weight components, said process comprising
    (a) contacting during a fluid catalytic cracking (FCC) process where $NO_x$ emissions are released from a regeneration zone of a fluid catalytic cracking unit (FCCU) operating in a heterogeneous combustion mode under FCC conditions, a hydrocarbon feedstock with a circulating inventory of a FCC cracking catalyst and a $NO_x$ reduction composition comprising (i) at least one $NO_x$ reduction component having a mean particle size of greater than 45 μm and having the ability to reduce $NO_x$ emissions released from a FCCU regeneration zone operating under oxidizing conditions during a FCC process without a significant increase in the content of reduced nitrogen species; and (ii) at least one reduced nitrogen species component having a mean particle size of greater than 45 μm and having the ability to reduce the content of reduced nitrogen species in a FCCU regeneration zone operating under reducing conditions during a FCC process without a significant increase in the content of $NO_x$ emissions, wherein $NO_x$ reduction component (i) and reduced nitrogen species component (ii) have different and distinct compositions and are used in an amount effective to reduce the content of $NO_x$ released from the FCCU regeneration zone; and
    (b) reducing the amount of $NO_x$ emissions released from the regeneration zone of the FCCU relative to the amount of $NO_x$ emissions released in the absence of the $NO_x$ reduction composition.

2. The process of claim 1 wherein the FCC cracking catalyst comprises a Y-type zeolite.

3. The process of claim 1 wherein the reduced nitrogen species component (ii) does not increase the content of $NO_x$ in the FCCU regeneration zone by more than 10% of the amount of $NO_x$ present in the regeneration zone absent the reduced nitrogen species component.

4. The process of claim 1 wherein the reduced nitrogen species component (ii) has the ability to convert reduced nitrogen species to molecular nitrogen under reducing conditions.

5. The process of claim 1 wherein the $NO_x$ reduction component (i) does not increase the content of reduced nitrogen species in the FCCU regeneration zone by more than 10% of the amount of reduced nitrogen species present in the regeneration zone absent the $NO_x$ reduction component.

6. The process of claim 1 wherein the $NO_x$ reduction component (i) reduces $NO_x$ emissions by converting $NO_x$ to $N_2$.

7. The process of claim 1 wherein the $NO_x$ reduction composition is a separate particle additive.

8. The process of claim 7 wherein the reduced nitrogen species component (ii) and the $NO_x$ reduction component (i) are contacted with the FCC cracking catalyst inventory independently as separate particles.

9. The process of claim 7 wherein the reduced nitrogen species component (ii) and the $NO_x$ reduction component (i) are physically admixed in a single additive particle.

10. The process of claim 9 wherein the $NO_x$ reduction composition is present in an amount of at least 0.01 wt % of the catalyst composition.

11. The process of claim 10 wherein the $NO_x$ reduction composition is present in an amount of at least 0.05 wt % of the catalyst composition.

12. The process of claim 11 wherein the $NO_x$ reduction composition is present in an amount of at least 0.1 wt % of the catalyst composition.

13. The process of claim 7 wherein the $NO_x$ reduction composition is present in an amount of at least 0.01 wt % of the catalyst inventory.

14. The process of claim 13 wherein the $NO_x$ reduction composition is present in an amount of at least 0.05 wt % of the catalyst inventory.

15. The process of claim 14 wherein the $NO_x$ reduction composition is present in an amount of at least 0.1 wt % of the catalyst inventory.

16. The process of claim 1 wherein the $NO_x$ reduction composition is an integral component of the cracking catalyst.

17. The process of claim 1 wherein the $NO_x$ reduction component (i) is a particulate composition selected from the group consisting of:
  (a) a composition which comprises (i) at least 1 wt %, measured as the oxide, of an acidic metal oxide containing substantially no zeolite; (ii) at least 0.5 wt % of metal component, measured as the oxide, selected from the group consisting of an alkali metal, an alkaline earth metal and mixtures thereof; (iii) at least 0.1 wt %, measured as the oxide, of a rare earth or transition metal oxygen storage metal oxide component and (iv) at least 0.1 ppm, measured as the metal, of a noble metal component selected from the group consisting of Pt, Pd, Rh, Ir, Os, Ru, Re and mixtures thereof, all percentages expressed being based on the total weight of the composition;
  (b) a composition which comprises (i) an acidic oxide support oxide; (ii) a metal component, measured as the oxide, selected from the group consisting of an alkali metal, an alkaline earth metal and mixtures thereof; (iii) a rare earth or transition metal oxygen storage metal oxide component; and (iv) a transition metal component selected from the group consisting of Groups Ib and IIb of the Periodic Table;
  (c) a composition which comprises (i) at least 1 wt %, measured as the oxide, of an acidic metal oxide; (ii) at least 0.5 wt % measured as the oxide, of a metal component selected from the group consisting of an alkali metal, an alkaline metal and mixtures thereof; (iii) at least 0.1 wt %, measured as the oxide, of a rare earth or transition metal oxygen storage metal oxide component and (iv) at least 0.01 wt %, measured as the metal, of a transition metal component selected from the group consisting of Groups IVA, VA, VIA, VIIA, VIIIA, IB and IIB of the Periodic Table, Sb, Bi and mixtures thereof; all percentages being based on the total weight of the composition;
  (d) a composition which comprises at least one metal-containing spinel which includes a first metal and a second metal having a valence higher than the valence of said first metal; and optionally at least one component of a third metal other than said first and second metals and optionally at least one component of a fourth metal other than said first, second and third metals, wherein said third metal is selected from the group consisting of Group IB metals, Group IIB metals, Group VIA metals, the rare earth metals, the Platinum Group metals and mixtures thereof, and said fourth metal is selected from the group consisting of iron, nickel, titanium, chromium, manganese. cobalt, germanium, tin, bismuth, molybdenum, antimony, vanadium and mixtures thereof;
  (e) a composition which comprises at least one zeolite having a pore size ranging from about 3 to about 7.2 Angstroms and a $SiO_2$ to $Al_2O_3$ molar ratio of less than about 500, wherein the zeolite is optionally stabilized with a metal selected from the group consisting of Groups IIA, IIIB, IVB, IB, VB, VIB, VIIB, VIII, IIB, IIIA, IVA, VA, and the Lanthanide Series of the Periodic Table, Ag and mixtures thereof;
  (f) a composition which comprises a copper-containing zeolite;
  (g) a composition comprising from about 2 to 80 wt % ZSM-5, optionally bound with a binder material to obtain a microsphere appropriate for use in a FCC unit under FCC conditions, wherein the binder material is selected from the group consisting of silica, alumina, alumina-phosphate and mixtures thereof;
  (h) a zinc based catalyst;
  (i) an antimony based $NO_x$ reduction additive;
  (j) a perovskite-spinel $NO_x$ reduction additive;
  (k) a hydrotalcite catalyst composition, optionally comprising at least one rare earth metal and at least one transition metal selected from the group of iron, nickel, titanium, chromium, manganese, cobalt, germanium, tin, bismuth, molybdenum, antimony, vanadium and mixtures thereof;
  (l) oxides of Mg—Al and Cu, and optionally Ce,
  (m) a low $NO_x$ CO combustion promoter composition which comprises a combustion promoting metal or compound of a metal selected from the group consisting of platinum, palladium, iridium, osmium, ruthenium, rhodium, rhenium, copper and mixtures thereof associated with at least one particulate porous inorganic solid;
  (n) a composition which comprises (i) an acidic oxide support; (ii) cerium oxide; (iii) a lanthanide oxide other than ceria; and optionally (iv) at least one oxide of a transition metal selection from the group consisting of Groups Ib and IIb of the Periodic Table and mixtures thereof;
  (o) a composition which comprises (i) an acidic oxide support, (ii) cerium oxide, (iii) a lanthanide series element other than ceria and (iv) optionally, at least one oxide of a transition metal selected from Groups IB and IIB of the Periodic Table, and mixtures thereof and (v) at least one precious metal from the group consisting of Pt, Pd, Rh, Ir, Os, Ru, Re and mixtures thereof;
  (p) a composition which comprises at least one Group VIII transition metal oxide, at least one Group IIIB metal oxide, at least one Group IIA alkaline earth metal oxide, and, optionally, microspheroidal alumina; and
  (q) mixtures thereof.

18. The process of claim 17 wherein the $NO_x$ reduction component (i) is composition (c) and the transition metal is selected from the group consisting of Ti, V, Cr, Mn, Fe, Co, Ni, Zr, Nb, Mo, Hf, W, Au, Cu, Zn and mixtures thereof.

19. The process of claim 17 wherein the $NO_x$ reduction component (i) is composition (d) and the first metal is magnesium, the second metal is aluminum, the third metal is at least one of the rare earth metals and the fourth metal is selected from the group consisting of vanadium, iron, nickel, manganese, cobalt, antimony and mixtures thereof.

20. The process of claim 17 wherein the $NO_x$ reduction component (i) is composition (m) and the porous inorganic solid is selected from the group consisting of alumina, titania, silica, zirconia and mixtures thereof.

21. The process of claim 17 wherein the $NO_x$ reduction component (i) is composition (f) and the copper is present as metal or ions in an amount equivalent to at least one half mole of CuO for each mole of alumina in the zeolite.

22. The process of claim 21 wherein the zeolite of the $NO_x$ reduction component (i) has the crystal structure of a zeolite selected from the group consisting of ZSM-5, ZSM-11, ZSM-12, ZSM-22, ZSM-23, ZSM-35, ZSM-38, ZSM-48, mordenite, dealuminated Y or Zeolite Beta.

23. The process of claim 17 wherein the $NO_x$ reduction component (i) is composition (e) and the zeolite is selected from the group consisting of ferrierite, ZSM-5, ZSM-11, beta, MCM-49, mordenite, MCM-56, Zeolite-L, zeolite Rho, errionite, chabazite, clinoptilolite, MCM-22, MCM-35, MCM-61, Offretite, A, ZSM-12, ZSM-23, ZSM-18, ZSM-22, ZSM-35, ZSM-57, ZSM-61, ZK-5, NaJ, Nu-87, Cit-1, SSZ-35, SSZ-48, SSZ-44, SSZ-23, Dachiardite, Merlinoite, Lovdarite, Levyne, Laumontite, Epistilbite, Gmelonite, Gismondine, Cancrinite, Brewsterite, Stilbite, Paulingite, Goosecreekite, Natrolite and mixtures thereof. Preferred zeolites are ferrierite, ZSM-5, ZSM-11, beta, MCM-49, mordenite, MCM-56, Zeolite-L, zeolite Rho, errionite, chabazite, clinoptilolite, MCM-22, MCM-35, Offretite, A, ZSM-12 and mixtures thereof.

24. The process of claim 17 wherein the $NO_x$ reduction component (i) is composition (p) and the metal of the Group VIII metal oxide is Co, the metal of the Group IIIB metal oxide is La, and the alkaline earth metal of the Group IIA alkaline earth metal oxide is Sr.

25. The process of claim 1 or 17 wherein the reduced nitrogen species component (ii) is a particulate composition selected from the group consisting of:
(a) a porous, amorphous or crystalline, refractory support material promoted with at least one metal selected from the group consisting of an alkaline earth metal, an alkali metal, a transition metal, a rare earth metal, a Platinum Group metal, a metal of Group IIB of the Periodic Table, germanium, tin, bismuth, antimony and mixtures thereof;
(b) a composition which comprises (i) at least 1 wt %, measured as the oxide, of an acidic metal oxide containing substantially no zeolite; (ii) at least 0.5 wt % of metal component, measured as the oxide, selected from the group consisting of an alkali metal, an alkaline earth metal and mixtures thereof; (iii) at least 0.1 wt %, measured as the oxide, of a rare earth metal or a transition metal oxygen storage metal oxide component and (iv) at least 0.1 ppm, measured as the metal, of a noble metal component selected from the group consisting of Pt, Pd, Rh, Ir, Os, Ru, Re and mixtures thereof, all percentages being based on the total weight of the composition;
(c) a composition which comprises a) at least 1 wt %, measured as the oxide, of an acidic metal oxide containing substantially no zeolite; (b) at least 0.5 wt % of metal component, measured as the oxide, selected from the group consisting of an alkali metal, an alkaline earth metal and mixtures thereof; (c) at least 0.1 wt %, measured as the oxide, of a rare earth metal or a transition metal oxygen storage metal oxide component; (d) at least 0.1 ppm, measured as the metal, of a noble metal component selected from the group consisting of Pt, Pd, Rh, Ir, Os, Ru, Re and mixtures thereof and (e) 0.01 wt %, measured as the oxide, of a transition metal selected from the group consisting of Groups IB, IIB, IVA, VA, VIA, VIIA and VIIIA of the Periodic Table, and mixtures thereof, all percentages being based on the total weight of the composition;
(d) a composition which comprises at least one metal-containing spinel which includes a first metal and a second metal having a valence higher than the valence of said first metal; and at least one component of a third metal other than said first and second metals and optionally at least one component of a fourth metal other than said first, second and third metals, wherein said third metal is at least one Platinum Group metal and optionally, at least one metal selected from Group IB metals, Group IIB metals, Group VIA metals, the rare earth metals, and mixtures thereof, and said fourth metal is selected from the group consisting of iron, nickel, titanium, chromium, manganese. cobalt, germanium, tin, bismuth, molybdenum, antimony, vanadium and mixtures thereof;
(e) a composition which comprises at least one zeolite having a pore size ranging from about 3 to about 7.2 Angstroms and a $SiO_2$ to $Al_2O_3$ molar ratio of less than about 500 and at least 1 ppm of a noble metal compound selected from the group consisting of Pt, Pd, Rh Ir, Os, Ru, Re and mixtures thereof, wherein the zeolite is optionally stabilized with a metal selected from the group consisting of Groups IIA, IIIB, IVB, IB, VB, VIB, VIIB, VIII, IIB, IIIA, IVA, VA, and the Lanthanide Series of the Periodic Table, Ag and mixtures thereof;
(f) a composition which comprises a copper containing zeolite and at least 0.1 ppm of a noble metal compound selected from the group consisting of Pt, Pd, Rh, Ir, Os, Ru, Re and mixtures thereof;
(g) composition comprising from about 25 to 80 wt % ZSM-5 and at least 0.1 ppm of a noble metal compound selected from the group consisting of Pt, Pd, Rh, Ir, Os, Ru, Re and mixtures thereof, wherein the zeolite is optionally bound with a binder material selected from the group consisting of silica, alumina, alumina-phosphate and mixtures thereof to obtain microspheres appropriate for use in a FCC unit under FCC conditions,
(h) a zinc based catalyst and at least 0.1 ppm of a noble metal compound selected from the group consisting of Pt, Pd, Rh, Ir, Os, Ru, Re and mixtures thereof;
(i) an antimony based $NO_x$ reduction additive and at least 0.1 ppm of a noble metal compound selected from the group consisting of Pt, Pd, Rh, Ir, Os, Ru, Re and mixtures thereof;
(j) a perovskite-spinel $NO_x$ reduction additive and at least 0.1 ppm of a noble metal compound selected from the group consisting of Pt, Pd, Rh, Ir, Os, Ru, Re and mixtures thereof;
(k) a hydrotalcite catalyst composition and at least 0.1 ppm of a noble metal compound selected from the group consisting of Pt, Pd, Rh, Ir, Os, Ru, Re and mixtures thereof, the hydrotalcite catalyst composition optionally comprising at least one rare earth metal and at least one transition metal selected from the group of iron, nickel, titanium, chromium, manganese. cobalt, germanium, tin, bismuth, molybdenum, antimony, vanadium and mixtures thereof;

(l) oxides of Mg—Al and Cu, and optionally Ce, and at least 0.1 ppm of a noble metal compound selected from the group consisting of Pt, Pd, Rh, Ir, Os, Ru, Re and mixtures thereof;

(m) a $NO_x$ reduction composition which comprises (i) an acidic metal oxide, (ii) cerium oxide, (iii) a lanthanide oxide other than ceria, (iv) optionally, at least one oxide of a transition metal selected from Groups IB and IIB of the Periodic Table, and mixtures thereof, and (v) and at least one noble metal selected from the group consisting of Pt, Pd, Rh, Ir, Os, Ru, Re and mixtures thereof;

(n) a composition which comprises at least one Group VIII transition metal oxide, at least one Group IIIB metal oxide, at least one Group IIA alkaline earth metal oxide, optionally, microspheroidal alumina, and at least 0.1 ppm of a noble metal compound selected from the group consisting of Pt, Pd, Rh, Ir, Os, Ru, Re and mixtures thereof; and (o) mixtures thereof.

26. The process of claim 25 wherein the reduced nitrogen species component (ii) is composition (c) and the transition metal is selected from the group consisting of Ti, V, Cr, Mn, Fe, Co, Ni, Zr, Nb, Mo, Hf, W, Au, Cu, Zn and mixtures thereof.

27. The process of claim 25 wherein the reduced nitrogen species component (ii) is composition (d) and the first metal is Mg, the second metal is Al, the third metal is at least one of the rare earth metals and at least one of the Platinum Group metal, and the fourth metal is selected from the group consisting of vanadium, iron, nickel, manganese, cobalt, antimony and mixtures thereof.

28. The process of claim 25 wherein the reduced nitrogen species component (ii) is composition (f) and the copper is present as Cu metal or ions in an amount equivalent to at least one half mole of CuO for each mole of alumina in the zeolite.

29. The process of claim 28 wherein the zeolite of the reduced nitrogen species component (ii) has the crystal structure of a zeolite selected from the group consisting ZSM-5, ZSM-11, ZSM-12, ZSM-22, ZSM-23, ZSM-35, ZSM-38, ZSM-48, mordenite, dealuminated Y or Zeolite Beta.

30. The process of claim 25 wherein the reduced nitrogen species component (ii) is composition (e) and the zeolite is selected from the group consisting of ferrierite, ZSM-5, ZSM-11, beta, MCM-49, mordenite, MCM-56, Zeolite-L, zeolite Rho, errionite, chabazite, clinoptilolite, MCM-22, MCM-35, MCM-61, Offretite, A, ZSM-12, ZSM-23, ZSM-18, ZSM-22,ZSM-22, ZSM-35, ZSM-57, ZSM-61, ZK-5, NaJ, Nu-87, Cit-1, SSZ-35, SSZ-48, SSZ-44, SSZ-23, Dachiardite, Merlinoite, Lovdarite, Levyne, Laumontite, Epistilbite, Gmelonite, Gismondine, Cancrinite, Brewsterite, Stilbite, Paulingite, Goosecreekite, Natrolite and mixtures thereof Preferred zeolites are ferrierite, ZSM-5, ZSM-11, beta, MCM-49, mordenite, MCM-56, Zeolite-L, zeolite Rho, errionite, chabazite, clinoptilolite, MCM-22, MCM-35, Offretite, A, ZSM-12 and mixtures thereof.

31. The process of claim 25 wherein the reduced nitrogen species component (ii) is composition (n) and the metal of the Group VIII metal oxide is Co, the metal of the Group IIIB metal oxide is La and the metal of the Group IIA alkaline earth metal oxide is Sr.

32. The process of claim 1 further comprising recovering the cracking catalyst from said contacting step and treating the used catalyst in a regeneration zone to regenerate said catalyst.

33. The process of claim 1 wherein the cracking catalyst and the particulate $NO_x$ reduction composition are fluidized during contacting said hydrocarbon feedstock.

34. The process of claim 1 wherein the particulate $NO_x$ reduction composition has a mean particle size from about 50 to about 200 μm.

35. The process of claim 34 wherein the particulate $NO_x$ reduction composition has a mean particle size from about 55 to about 150 μm.

36. The process of claim 1 wherein the particulate $NO_x$ reduction composition has a Davison attrition index (DI) value of less than 50.

37. The process of claim 36 wherein the particulate $NO_x$ reduction composition has a DI value of less than 20.

38. The process of claim 37 wherein the particulate $NO_x$ reduction composition has a DI value of less than 15.

39. The process of claim 1 wherein the $NO_x$ reduction component (i) and the reduced nitrogen species component (ii) are present in the $NO_x$ reduction composition in a ratio of 0.02 to 50.

40. The process of claim 39 wherein the $NO_x$ reduction component (i) and the reduced nitrogen species component (ii) are present in the $NO_x$ reduction composition in a ratio of 0.1 to 10.

41. The process of claim 40 wherein the $NO_x$ reduction component (i) and the reduced nitrogen species component (ii) are present in the $NO_x$ reduction composition in a ratio of 0.2 to 5.0.

42. The process of claim 1 wherein at least one of the $NO_x$ reduction component (i) and the reduced nitrogen species component of the $NO_x$ reduction composition (ii) is contacted with the FCC cracking catalyst inventory as a separate particle additive and the other component is incorporated as an integral component of the cracking catalyst.

* * * * *